United States Patent
Osadchyy et al.

(10) Patent No.: US 10,338,861 B2
(45) Date of Patent: Jul. 2, 2019

(54) FORMULATION AND IMPLEMENTATION OF RULES ASSOCIATED WITH PRINTING DEVICES

(71) Applicant: KYOCERA Document Solutions Inc., Osaka (JP)

(72) Inventors: Oleksandr Osadchyy, Concord, CA (US); Oleksandr Zinchenko, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/582,190

(22) Filed: Apr. 28, 2017

(65) Prior Publication Data

US 2018/0314468 A1  Nov. 1, 2018

(51) Int. Cl.
  *G06K 15/02* (2006.01)
  *G06F 3/12* (2006.01)
  *H04N 1/32* (2006.01)
  *H04N 1/00* (2006.01)

(52) U.S. Cl.
  CPC ............ *G06F 3/121* (2013.01); *G06F 3/1234* (2013.01); *G06F 3/1285* (2013.01); *H04N 1/32* (2013.01); *H04N 1/00002* (2013.01); *H04N 1/00061* (2013.01); *H04N 1/00344* (2013.01); *H04N 1/32635* (2013.01)

(58) Field of Classification Search
  None
  See application file for complete search history.

(56) References Cited

U.S. PATENT DOCUMENTS

| | | |
|---|---|---|
| 7,340,501 B2 | 3/2008 | Miida et al. |
| 8,125,663 B2 | 2/2012 | Yamada |
| 2002/0049839 A1* | 4/2002 | Miida ................. G06F 11/3013 709/224 |
| 2005/0055236 A1 | 3/2005 | Bondy et al. |
| 2015/0125073 A1* | 5/2015 | Hwang ............. G06K 9/00671 382/159 |
| 2015/0271359 A1* | 9/2015 | Nakai ................ H04N 1/32662 358/1.15 |
| 2016/0098234 A1* | 4/2016 | Weaver ................. G06F 3/1234 358/1.15 |

* cited by examiner

*Primary Examiner* — Benny Q Tieu
*Assistant Examiner* — Harris Sabah
(74) *Attorney, Agent, or Firm* — McDonnell Boehnen; Hulbert & Berghoff LLP

(57) ABSTRACT

The present disclosure relates to formulation and implementation of rules associated with printing devices. One example embodiment includes a method. The method includes monitoring, by a computing device, events associated with one or more printing devices. The method also includes identifying, by the computing device, a correlation between a first event type of the monitored events and a second event type of the monitored events. Further, the method includes formulating, by the computing device, a rule based on the correlation. According to the rule, when the first event type occurs, the computing device causes the second event type to occur in response. In addition, the method includes receiving, by the computing device, an indication that the rule should be implemented on the one or more printing devices. The method further includes implementing, by the computing device, the rule on the one or more printing devices.

20 Claims, 12 Drawing Sheets

US 10,338,861 B2

FORMULATION AND IMPLEMENTATION OF RULES ASSOCIATED WITH PRINTING DEVICES

BACKGROUND

Unless otherwise indicated herein, the materials described in this section are not prior art to the claims in this application and are not admitted to be prior art by inclusion in this section.

In recent years, various types of printing devices have become popular for both business and consumer use. In addition to traditional black and white printers, color printers, scanners, copiers, fax machines, and other components are now common. Multifunctional products (MFPs), that support two or more of these operations, are also widely available.

During the lifetime of a printing device, a multitude of events may be performed by and on the printing device. Such events may exhibit some level of correlation with one another. For example, when the toner level is low, a replacement ink cartridge may be installed. Similarly, when a printing device is unable to connect to a network, a service technician may be dispatched to the printing device.

SUMMARY

The specification and drawings disclose embodiments that relate to formulation and implementation of rules associated with printing devices.

In a first aspect, the disclosure describes a method. The method includes monitoring, by a computing device, events associated with one or more printing devices. The method also includes identifying, by the computing device, a correlation between a first event type of the monitored events and a second event type of the monitored events. Further, the method includes formulating, by the computing device, a rule based on the correlation. According to the rule, when the first event type occurs, the computing device causes the second event type to occur in response. In addition, the method includes receiving, by the computing device, an indication that the rule should be implemented on the one or more printing devices. The method further includes implementing, by the computing device, the rule on the one or more printing devices In a second aspect, the disclosure describes a system. The system includes one or more printing devices. The system also includes a printing device manager. The printing device manager includes instructions, stored on a non-transitory, computer-readable medium, that are executable by a processor. The instructions are executable to monitor events associated with the one or more printing devices. The instructions are also executable to identify a correlation between a first event type and a second event type of the monitored events. Further, the instructions are executable to formulate a rule based on the correlation. According to the rule, when the first event type occurs, the processor causes the second event type to occur in response. The instructions are additionally executable to receive an indication that the rule should be implemented on the one or more printing devices. In addition, the instructions are executable to implement, by the computing device, the rule on the one or more printing devices. Also, the instructions are executable to implement, by the computing device, the rule on the one or more printing devices.

In a third aspect, the disclosure describes a printing device. The printing device is configured to provide, in response to a polling from a computing device, one or more signals corresponding to the printing device. The printing device is also configured to implement a rule formulated by the computing device. The rule is based on a correlation between a first event type and a second event type. The first event type corresponds to at least one of the one or more signals. The second event type corresponds to at least one of the one or more signals. The computing device received an indication that the rule should be implemented on the printing device. Further, the printing device is configured to perform the second event type in response to the first event type occurring, based on the implement rule.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
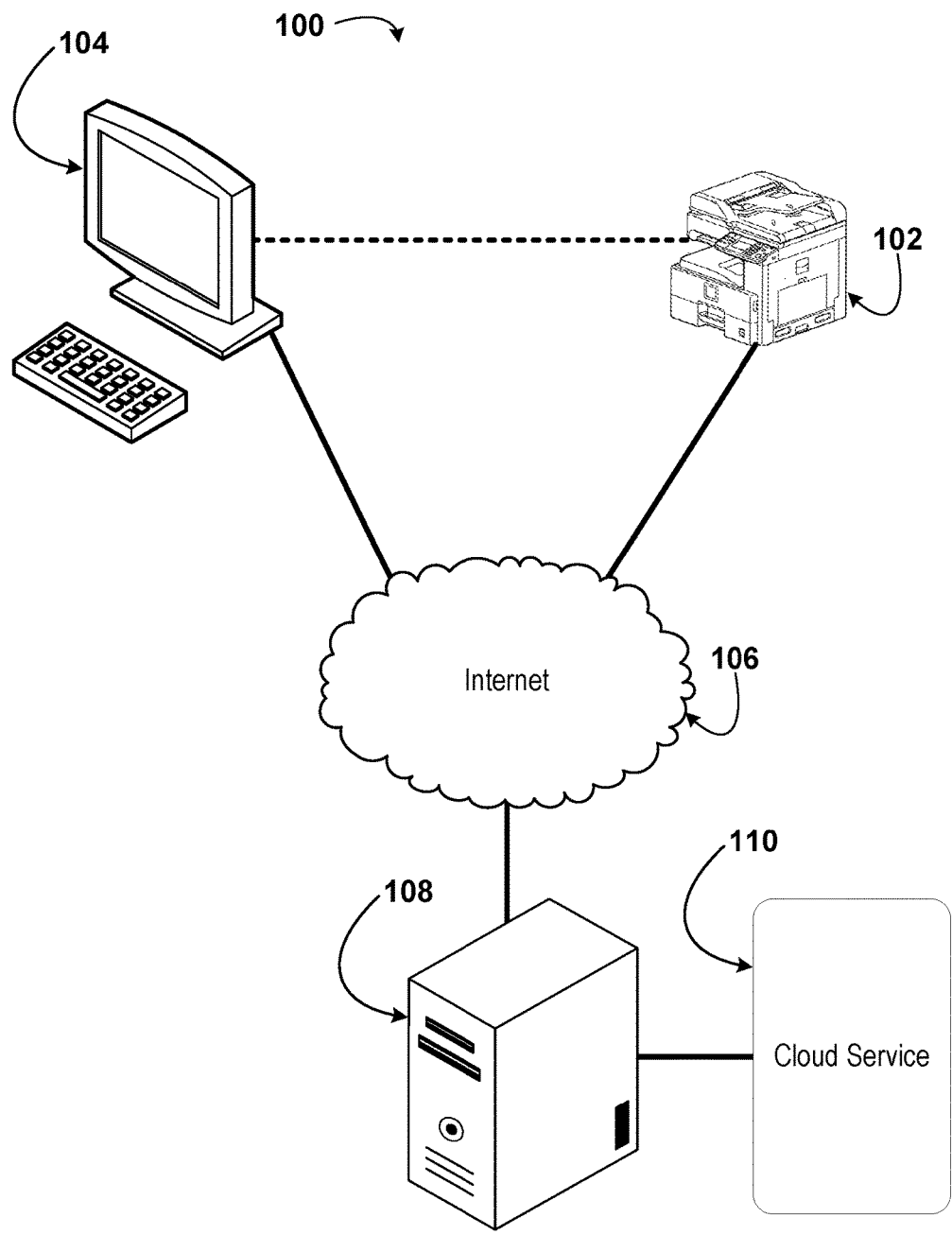
FIG. 1 is an illustration of a printing system, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments may relate to formulation and implementation of rules associated with printing devices. Such rules may be used to automate recurring operations that are associated with a printing device (e.g., recurring user operations or recurring device operations).

One example includes a method for formulating and implementing a rule associated with one or more printing devices. The method may be performed within a system of an organization. For example, the system may include the one or more printing devices (e.g., printers) and a printing device manager (e.g., a computing device with a processor configured to execute instructions stored on a non-transitory, computer-readable medium). The printing device manager may be connected locally to the printing device. Alternatively, the components of the system may communicate with one another over a network (e.g., a local area network, LAN, or the public Internet). For example, the printing device manager may be a server connected via a network controller to the public Internet. The printing device manager may manage all printing devices within the organization or a subset of printing devices in the organization. In some embodiments, the printing device manager may manage printing devices from other organizations, as well.

The method may include the printing device manager monitoring events that occur with respect to the one or more printing devices. The events may be initiated by the printing device itself (e.g., printing a document, scanning a document, powering off, powering on, illuminating status lights, transmitting error or alert messages, etc.). Additionally or alternatively, the events may be initiated by a terminal device (e.g., a personal computing device or a tablet computing device configured to translate input from a user to commands to the printing device). Such events from a terminal device may include a print request, a scan request, a copy request, a fax request, etc. Monitoring the events that occur with respect to the printing device may include polling the printing device for associated device states (e.g., at predefined intervals). Monitoring the events may also include checking event logs to establish prior events that occurred with respect to the printing device (e.g., the last time the toner was replaced, how often paper jams are cleared, or the last time a service technician was dispatched to the printing device).

Then, based on the monitored events, the printing device manager may identify certain correlations between events. Identifying correlations may include comparing one event to another to see if they occurred within a specific length of time of one another (e.g., the second event happened less than five minutes after the first event). Additionally or alternatively, identifying correlations may include determining if two events occur within a specified length of time of one another a certain percentage of the times when the first event occurs (e.g., at least 90% of the time when a paper jam alert is transmitted by the printing device, a technician is dispatched to the printing device within 24 hours). As such, identifying correlations between first event types and second event types may include comparing associated correlation values to thresholds to determine if a correlation is present. For example, if on Fridays at 5:00 PM, a user typically powers off the printing device, a measurement may be taken of the number of Fridays within a year in which this happens. The number of Fridays within the year may be compared to a threshold value of 30 to determine if a correlation is actually present (i.e., if the printing device is shut down at 5:00 PM for at least 31 of the Fridays occurring throughout the year, a correlation is present). In other embodiments, the correlation may involve a sequence of more than two events (e.g., 5, 10, or even 100 events). Further, in various embodiments, various potential correlations may be identified.

After identifying a correlation, the method may include the printing device manager formulating a rule. Formulating the rule may include determining that the second event of the correlation should be automated in response to the first event. To continue with the above example, if the first event of the correlation was an internal clock of the printing device reaching 5:00 PM on a Friday, the rule may suggest that, rather than a user powering off the printing device, the printing device powers itself down (e.g., the printing device, itself, completes the second event type, rather than a user). Additional example rules based on correlations, just to name a few, may include: if five paper jams occur on the printing device within a day, the printing device manager dispatches a service technician to the printing device; if fewer than 10 pages are printed in a month on the printing device, the printing device shortens its sleep time (i.e., time duration before the printing device goes into a sleep mode) by 50%; if scanned documents are too large to email at least 50% of the time within a given day, the printing device reduces the default scan resolution; if the number of paper jams increased by 50% from one day to the next for three consecutive days, the printing device adjusts settings of the decurler in the printing device; if the ping time for the printing device exceeds 500 ms, the printing device manager transmits a message to the printing device to restart the printing device; and if the date reaches the first day of a calendar month, the printing device manager resets the account balance of each account associated with the printing device (e.g., if each account can print a limited number of pages using the printing device each month).

As described, the rules may include actions taken by the printing device and/or the printing device manager. Further, the trigger events of the rules (e.g., the first events) may be events performed by the printing device, by the printing device manager, or by third parties (e.g., users printing or scanning documents using the printing the printing device). Many rules other than those enumerated above are also possible.

The method may also include receiving (e.g., by the printing device manager) an indication that the rule should be implemented on the printing device. For example, after formulating the rule, the printing device manager may prompt a user to accept the proposed rule. Prompting a user may include the printing device manager transmitting an email with an accept link and a decline link, sending a pop notification to an application running on a tablet computing device or a mobile computing device, or displaying text on a user interface of the printing device manager requesting that user accept or decline the rule.

Further, the method may include implementing the rule on the printing device. Implementing the rule may include storing the rule within a memory of the printing device and/or storing the rule within the printing device manager. Additionally, implementing the rule may include monitoring events occurring within the printing device, such that when the first event type occurs, the second event type is triggered and caused to happen (e.g., when a toner level drops below 10%, the printing device manager orders replacement toner for the printing device).

II. Example Systems

FIG. 1 is an illustration of a printing system 100, according to example embodiments. The printing system 100 may include a printing device 102, a terminal device 104, an internet 106, a cloud server 108, and a cloud service 110.

Figure 3:
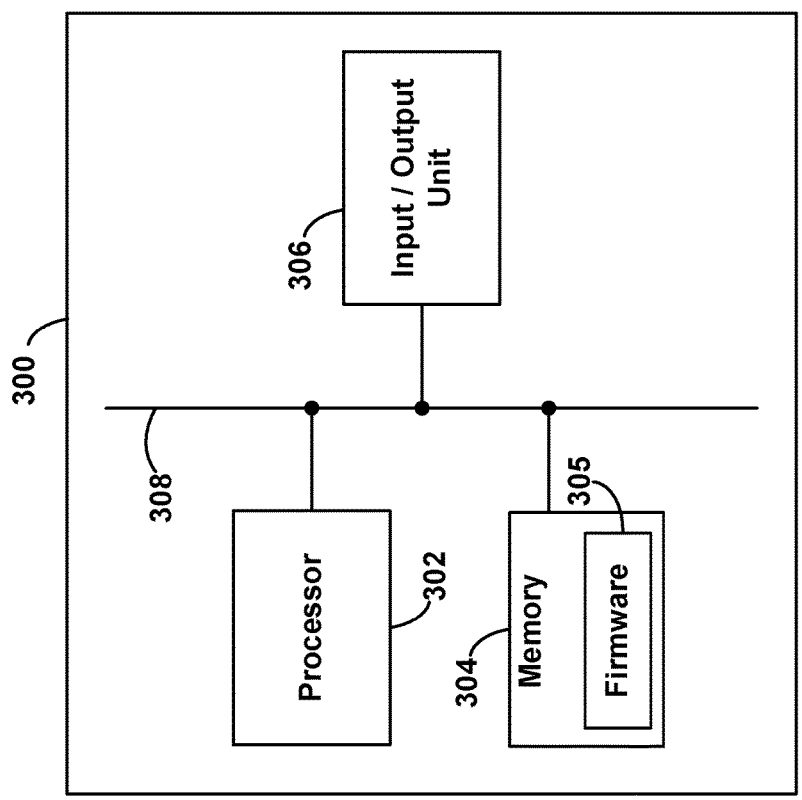
FIG. 3 is a schematic block diagram illustrating components of a printing device, according to example embodiments.

The printing device 102 is configured to reproduce digital data (e.g., by printing the digital data). In some embodiments, this may include a two-dimensional (2D) print onto paper using ink. Additionally or alternatively, reproducing digital data may include three-dimensional (3D) printing. In addition to printing, the printing device 102 may be configured to perform other tasks, such as scanning or faxing, as is the case when the printing device 102 is a multi-functional peripheral (MFP). Further, the printing device may include one or more computing components, in some embodiments (e.g., as illustrated in FIG. 3).

The terminal device 104 is a device that may be configured to take input commands from a user and communicate those commands to the printing device 102 or the cloud server 108. The terminal device 104 may communicate with the printing device 102 and the cloud server 108 through the internet 106 (e.g., the public Internet), as illustrated. Additionally, the terminal device 104 may, in some embodiments, communicate with the printing device 102 locally, such as over a LAN or wide area network (WAN). This communication may take place wirelessly (e.g., using BLUETOOTH® or Wi-Fi®, IEEE 802.11 standards) or via wireline connection (e.g., a universal serial bus, USB, connection or an Ethernet connection), in various embodiments. The terminal device 104 may be configured to monitor events that occur within the printing device 102, as well (e.g., pages printed, paper jams, powering on, powering off, transmissions, services by technicians, scans, emails, outgoing faxes, incoming faxes, etc.).

The terminal device 104 may be selected from among a variety of different devices. The terminal device 104 may be a personal computer (PC), as illustrated, in some embodiments. Alternatively, the terminal device 104 may be a tablet computing device or a mobile computing device (e.g., mobile phone). In still other embodiments, the terminal device 104 may be a combination of multiple devices (e.g., a tablet computing device that is wirelessly tethered to a personal computer). Further, in some embodiments, the printing system 100 may include more than one terminal device. For example, the printing system 100 may include a first terminal device in the form of a PC and a second terminal device in the form of a tablet computing device.

The cloud server 108 may be a server that facilitates interaction between the terminal device 104 and/or the printing device 102 and the cloud service 110. The cloud server 108 may be configured to monitor events that occur within the printing device 102, as well (e.g., pages printed, paper jams, powering on, powering off, transmissions, services by technicians, scans, emails, outgoing faxes, incoming faxes, etc.). Further, the cloud server 108 may contain a memory. The memory may be a non-transitory, computer-readable medium that includes a volatile memory, such as a random access memory (RAM), and/or a non-volatile memory, such as a read-only memory (ROM). The memory may store instructions, executable by a processor of the cloud server 108, to communicate with the terminal device 104 and/or the printing device 102 over the interne 106. Additionally or alternatively, such a memory may store instructions, executable by a processor of the cloud server 108, to perform the operations of the cloud service 110. In other words, in some embodiments, the cloud service 110 may represent software internal to the cloud server, rather than a component external to the cloud server 108. Even further, such a memory may store data for use by the cloud service 110.

The cloud service 110 may be a subscription service associated with the cloud server 108. Alternatively, the cloud service 110 may be spread across multiple cloud servers or devices. For example, the cloud service 110 may be executed by processing units spread across multiple cloud servers according to multiple sets of instructions stored within memories of the corresponding multiple cloud servers.

The terminal device 104 and/or the printing device 102 may have credentials (e.g., a user identification, ID, as well as an associated password) used to authenticate the respective device before logging into the cloud service 110. Within the cloud service 110, there may be an association between the terminal device 104 and the printing device 102. For example, the cloud service 110 may permit the terminal device 104 to access information about the printing device 102 using the cloud service 110, and vice versa. Further, the cloud service 110 may permit requests originating from the terminal device 104 (e.g., printing requests) to be transmitted to and/or executed on the printing device 102.

The cloud server 108 and the cloud service 110 may be located on a public or private cloud. For example, in some embodiments, the cloud service 110 may be implemented using MICROSOFT® AZURE® or CITRIX® XENSERVER®.

Figure 2:
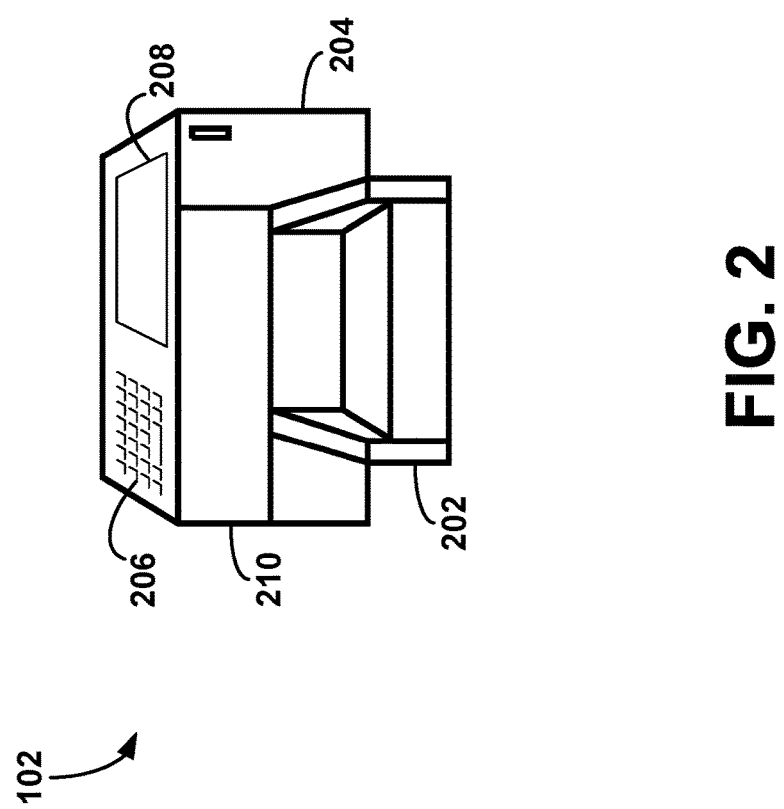
FIG. 2 is an illustration of a printing device, according to example embodiments.

FIG. 2 depicts an example printing device 102. The printing device 102 may be configured to print electronic documents on various types of physical output media. These output media include, but are not limited to, various sizes and types of paper, overhead transparencies, and so on. The printing device 102 may be interchangeably referred to as a "printer", a "printing device", a "printing apparatus", an "image forming device", an "image processing apparatus", an "image processing device", an "image forming apparatus", etc.

The printing device 102 may serve as a local peripheral to a terminal device 104, such as a personal computer. In these cases, the printing device 102 may be attached to the terminal device 104 by cable, such as a serial port cable, parallel port cable, USB cable, FIREWIRE® (IEEE 1394) cable, or High-Definition Multimedia Interface (HDMI) cable. Thus, the terminal device 104 may serve as a source of electronic documents (e.g., in the form of document data) for the printing device 102.

Additionally or alternatively, the printing device 102 may include a wireline or wireless network interface, such as an Ethernet or Wi-Fi® (IEEE 802.11 standards) interface. So arranged, the printing device 102 may serve as a printing device for any number of terminal devices that can communicate with the printing device 102 over a network. In some embodiments, the printing device 102 may serve as both a local peripheral and a networked printer at the same time. In order to use the printing device 102, terminal devices may install one or more drivers. These drivers may include software that converts electronic documents to be printed from various local representations, stored on the terminal devices, to one or more representations supported by the printing device 102.

Regardless, the printing device 102 may comprise a computing device, and may carry out both printing-related and non-printing related tasks. For instance, the printing device 102 may also include copier, fax, and scanner functions (e.g., the printing device 102 may be a multi-functional product, MFP). In some embodiments, the printing device 102 may use a scanning unit to facilitate copier and/or fax functions. For instance, the printing device 102 may scan a physical document into an electronic format, and then print the resulting electronic document to provide a copy, and/or transmit the resulting electronic document via a telephone interface to provide a fax operation. Additionally, the printing device 102 may be able to receive a faxed electronic document via a telephone interface, and then compress and store a representation of this electronic document and/or print the electronic document.

In order to support its various capabilities, the printing device 102 may include a document feeder/output tray 202, a paper storage 204, a user interface 206, a scanning element 208, and a chassis 210. It is understood that printing devices may take on a wide variety of forms. As such, the printing device 102 may include more or fewer components than depicted in FIG. 2, and/or components arranged in a different fashion than depicted in FIG. 2.

The document feeder/output tray 202 may hold physical documents (e.g., a stack of one or more sheets of paper) that are to be scanned, copied, or faxed. The document feeder/output tray 202 may allow the printing device 102 to automatically feed multiple physical documents for processing by the printing device 102 without requiring manual intervention. The document feeder/output tray 202 may also include one or more separate output trays for holding physical documents that have been processed by the printing device 102. These may include physical documents that have been printed, scanned, copied, or faxed by the printing device 102, as well as physical documents that have been produced, e.g., by the fax and/or copying functions of the printing device 102.

Paper storage 204 may include trays and/or feeding elements for various types of physical media. For instance, paper storage 204 may include separate trays for 8.5×11 inch paper, A4 paper, letterhead paper, envelopes, and so on. For any operation of the printing device 102 that involves outputting physical media (e.g., printing, copying, and/or receiving a fax), paper storage 204 may supply the physical media.

The user interface 206 may facilitate the interaction of the printing device 102 with a human or non-human user, such as to receive input from a user and to provide output to the user. Thus, the user interface 206 may include input components such as a keypad, keyboard, touch-sensitive or presence-sensitive panel, joystick, microphone, still camera, and/or video camera. The user interface 206 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. The user interface 206 may also be configured to be able to generate audible output(s) via a speaker, speaker jack, audio output port, audio output device, earphones, and/or other similar devices, now known or later developed.

The scanning element 208 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with the printing device 102.

The chassis 210 may include a physical housing that contains and/or interconnects various components of the printing device 102, such as the document feeder/output tray 202, paper storage 204, the user interface 206, and the scanning element 208. Additionally, the chassis 210 may house other components not shown in FIG. 2. For example, the chassis 210 may contain one or more toner cartridges, liquid ink jets, belts, rollers, and/or power supplies. Further, the chassis 210 may include communication interfaces, such as wireline and/or wireless network interfaces, a telephony interface (e.g., an RJ45 jack), a USB interface, a BLUETOOTH® interface, a card reader port, etc.

Moreover, as the printing device 102 may employ general-purpose and/or specially-designed computing device components, the chassis 210 may also house some or all of these components. To that point, FIG. 3 depicts an example embodiment of computing device components 300 (e.g., functional elements of a computing device) that may be included in the printing device 102.

Computing device components 300 may include a processor 302, a memory 304, and an input/output unit 306, all of which may be coupled by a system bus 308 or a similar mechanism. The processor 302 may include one or more central processing units (CPUs), such as one or more general purpose processors and/or one or more dedicated processors (e.g., application specific integrated circuits (ASICs) or digital signal processors (DSPs)).

The memory 304, in turn, may comprise volatile and/or non-volatile data storage and can be integrated in whole or in part with the processor 302. The memory 304 may store program instructions, executable by the processor 302, and data that are manipulated by these instructions to carry out the various methods, processes, or functions described herein. Alternatively, these methods, processes, or operations can be defined by hardware, firmware, and/or any combination of hardware, firmware, and software. Therefore, memory 304 may include a tangible, non-transitory, computer-readable medium, having stored thereon program instructions that, upon execution by one or more processors 302, cause the respective devices to carry out any of the methods, processes, or functions disclosed in this specification or the accompanying drawings.

One set of instructions within the memory 304 may be firmware 305. The firmware 305 may contain instructions, executable by the processor 302, that enable the printing device 102 to process documents. For example, some of the instructions contained within the firmware 305 may assist the printing device 102 in printing documents sent to it by the terminal device 104. In addition, the firmware 305 may contain instructions, executable by the processor 302, to respond to a polling from a printing device manager, for example.

The memory 304 may also be configured to store compressed and non-compressed electronic documents that may later be processed (e.g., printed or faxed), such as a document that represents a print job that is received by the printing apparatus 102 and designates a future time for completion. Thus, the memory 304 may serve as an output medium for these electronic documents.

The input/output unit 306 may include any of the operations and/or elements described in reference to the user interface 206. Thus, the input/output unit 306 may serve to configure and/or control the operation of the processor 302. The input/output unit 306 may also provide output based on the operations performed by the processor 302.

Similar components to those illustrated in FIG. 3 may be included within the terminal device 104 or the cloud server 108, in various embodiments. In such embodiments, the memory 304 within the terminal device 104 and/or the cloud server 108 may not include the firmware 305.

Figure 4:
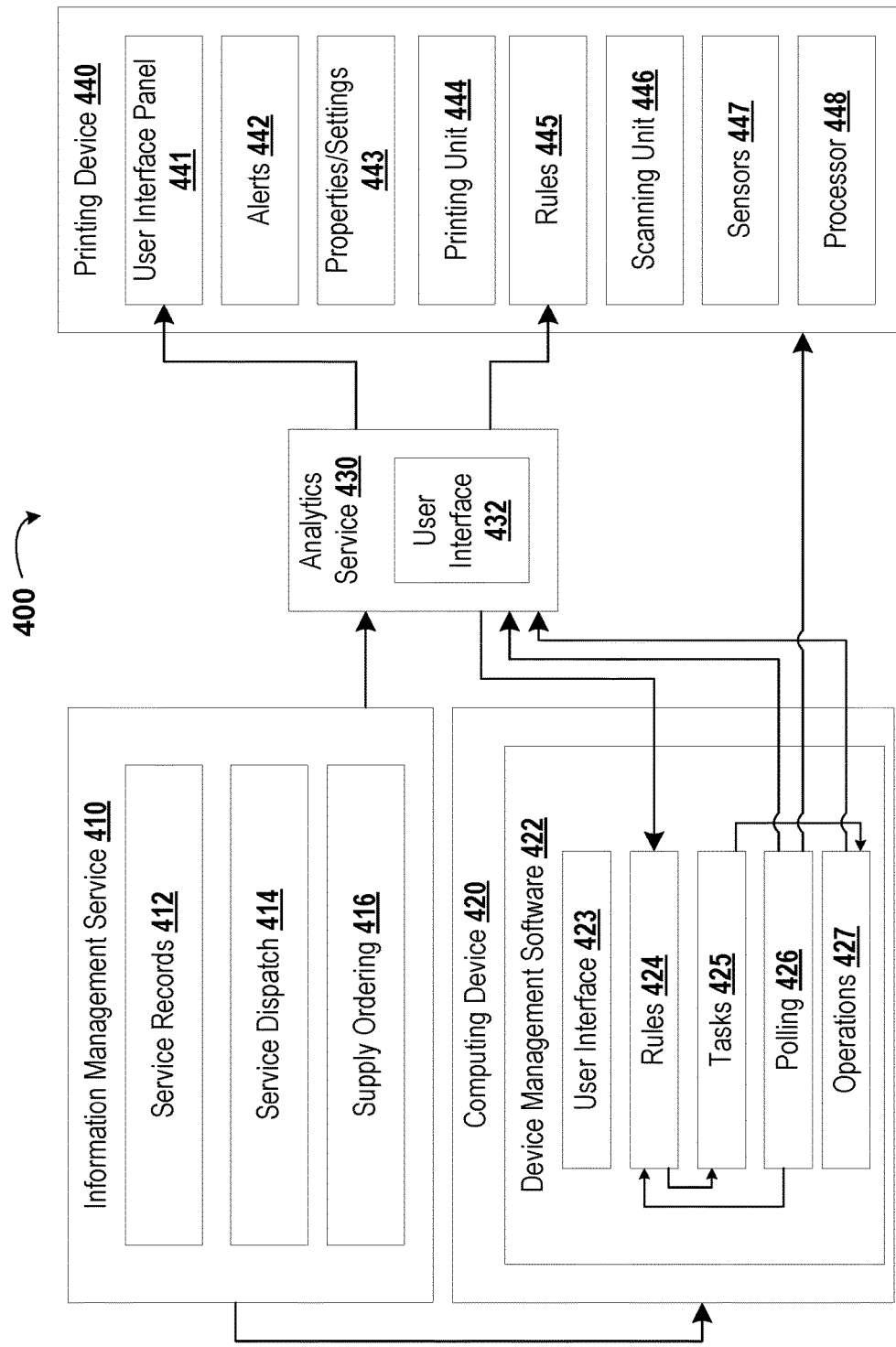
FIG. 4 is a schematic block diagram illustrating components of a system, according to example embodiments.

FIG. 4 illustrates a printing device management system 400, according to example embodiments. The printing device management system 400 may include an information management service 410, a computing device 420, an analytics service 430, and a printing device 440. In some embodiments, the printing device management system 400 will employ one or more components of the system 100 illustrated in FIG. 1. For example, the computing device 420 may be the terminal device 104 illustrated in FIG. 1. Further, the printing device 440 may be the printing device 102 illustrated in FIG. 1. In some embodiments, the information management service 410 may be stored within the cloud server 108 or the cloud service 110 illustrated in FIG. 1. Alternatively, the information management service 410 may be a component of the terminal device 104. In still other embodiments, the information management service 410 may be a standalone terminal device or cloud server (neither of which are illustrated in FIG. 1). In addition, the analytics service 430 may be a component of the terminal device 104. In other embodiments, the analytics service 430 may be a standalone device (e.g., a standalone terminal device, tablet computing device, or mobile computing device). In some embodiments, the information management service 410, the computing device 420, and the analytics service 430 may collectively make up a printing device manager configured to manage one or more printing devices across one or more networks and/or organizations.

As illustrated, the information management service 410, the computing device 420, the analytics service 430, and the printing device 440 may be communicatively coupled to one another. As an example, the computing device 420 may send data (e.g., polling results or operations) to the analytics service 430, send data (e.g., polling requests) to the printing device 440, receive data (e.g., indication that a proposed rule should be accepted) from the analytics service 430, and receive data from the information management service 410 (e.g., service history of the printing device 440). Similarly, the information management service 410 may transmit data to the computing device 420 or to the analytics service 430. In addition, the analytics service 430 may transmit data (e.g., rule acceptance or refusal) to the computing device 420, transmit data (e.g., rules or data for display) to the printing device 440, receive data (e.g., polling data or operational data) from the computing device 420, and receive data from the information management service 410. Likewise, the printing device 440 may receive data (e.g., polling data) from the computing device 420 and receive data (e.g., acceptance or rejection of rules or data for display) from the analytics service 430. Other types of data transfer and interconnections between the information management service 410, the computing device 420, the analytics service 430, and the printing device 440 are also possible, in various embodiments.

In some embodiments, one or more of the components illustrated within the information management service 410, the computing device 420, or the printing device 440 may represent software (e.g., instructions stored within a non-transitory, computer-readable medium associated with the respective device that are executable by a processor). For example, the device management software 422 of the computing device 420 may be executed by a processor of the computing device 420 to perform associated functions.

The information management service 410 may be a repository for data about the printing device 440, the computing device 420, or the analytics service 430. Further, in some embodiments, the information management service 410 may include data about additional printing devices (e.g., additional printing devices within a network or an organization). The information management service 410 may include service records 412, a service dispatch 414, and supply ordering 416. The service records 412, the service dispatch 414, and the supply ordering 416 may be stored within a non-transitory, computer-readable medium (e.g., on a server). Further, the service records 412, the service dispatch 414, and the supply ordering 416 may be accessible by other components of the printing device management system 400 (e.g., the computing device 420). In some embodiments, other components of the printing device management system 400 may access the data by communicating with a network controller within the information management service 410, for example.

In some embodiments, the information management service 410 may include additional components. For example, the information management service 410 may include settings to be used in printing devices. Such settings may include modifications to toner dispensing, drum rotation speed, etc. based on certain conditions (e.g., based on high elevation or temperature).

The service records 412 may include a list of the maintenance activities that have been performed on one or more printing devices within a network and/or organization of the printing device management system 400. For example, the service records 412 may contain a log of all maintenance activities (e.g., toner cartridge replacement, roller cleaning, scanner replacement, light source replacement, etc.) that have been performed on the printing device 440. The service records 412 may be transmitted to the device management software 422 in order to formulate rules. For example, the computing device 420 may use one or more events from the service records 412 as a trigger event or a response event occurring with respect to the printing device 440, thus being incorporated into a future rule.

The service dispatch 414 may include a set of instructions (e.g., executable by the computing device) executable to hail a service technician. For example, the service dispatch 414 may be executed to send a notification to a service technician indicating that one of the printing devices (e.g., the printing device 440) within an organization requires maintenance. Such a notification may include metadata about which printing devices require maintenance and/or what kind of maintenance is required (e.g., an indication that a paper jam is to be cleared from the printing device on floor 25 having identification number 12345). In some embodiments, when the service dispatch 414 is executed, the service records 412 may be updated to reflect that a technician has been dispatched to one or more printing devices, for example.

The supply ordering 416 may include a set of instructions (e.g., executable by the computing device 420) that order replacement supplies for one or more of the printing devices within an organization. For example, the supply ordering 416 may be executed to order replacement drums, toner cartridges, gears, belts, trays, electronic components, etc. from a supplier or manufacturer. Different supplies may be associated with different printing device models within the supply ordering 416, for example. In some embodiments, when the supply ordering 416 is executed, the service records 412 may be updated to reflect that replacement supplies have been ordered for one or more particular printing devices, for example.

The computing device 420 may perform analysis on data generated by the printing device 440 or stored within the information management service 410 in order to formulate and suggest rules. For example, the computing device 420 may use data from the printing device 440 and/or the information management system 410 to review events and correlations between those events. The computing device 420 includes device management software 422. The device management software 422 may be stored on a memory of the computing device 420 and executed by a processor, for example. The device management software 422 may include a user interface 423, rules 424, tasks 425, polling 426, and operations 427. As illustrated, various components of the device management software 422 may influence other components of the device management software 422 (e.g., the tasks 425 may influence the operations 427, the polling 426 may influence the rules 424, and the rules 424 may influence the tasks 425).

The user interface 423 may include instructions that, when executed by a processor of the computing device 420, take in input from and provide feedback to a user of the computing device 420. The user interface 423 may include instructions that present a graphical user interface (GUI) on a monitor of the computing device 420. The user interface 423 may also include instructions that translate user inputs (e.g., from a mouse or a keyboard) into actions to be performed by the computing device 420. For example, in some embodiments, the user interface 423 may include instructions that present a formulated rule on a GUI to a user and ask the user whether to implement the rule. Based on the user's input, the user interface 423 may then contain instructions to use the indication of whether to implement the rule to set a variable or transmit a notification to other parts of the computing device 420. The variable or the transmission may then be used to implement, or not implement, the proposed rule. The user interface 423 may also accept input to set preferences or change settings within the computing device 420 (e.g., set thresholds used to determine whether two events are sufficiently correlated to warrant the creation of a rule). Further, the user interface 423 may also accept input to modify or remove previously implemented rules. In addition, the user interface 423 may accept input from a user to create rules or suggest rules to the computing device 420 for implementation on the printing device 440.

The rules 424 may include instructions that, when executed by a processor of the computing device 420, formulate rules and/or implement previously formulated rules. For example, the rules 424 may include instructions that devise rules (e.g., by making comparisons of correlations to predetermined thresholds) based on data collected by the polling 426 from the printing device 440 and/or data from the service records 412 of the information management service 410. Further, the rules 424 may contain instructions that are executable to receive an indication from the analytics service that indicates whether a formulated/proposed rule should be implemented. In addition, the rules 424 may contain instructions that are used to generate tasks 425. In some embodiments, for instance, the rules 424 may receive information from the polling 426 (e.g., of the printing device 440) that a first event type has occurred. In response, the rules 424 may be executed to assign a second event type to be performed by the operations 427 according to the list of operations with the tasks 425. The second event types may then be provided to the operations 427 according to the tasks 425.

The tasks 425 may contain instructions that include a list of events that can be performed on or by the printing device 440. The tasks 425 may be used by the rules 424 to provide events that are to be performed by the operations 427. Various events or processes can be added to the tasks 425 based on the rules 424, in some embodiments. For example, upon implementing a rule within the rules 424 or within the printing device 440, a task to be performed in response to a first event type occurring may be added to the tasks 425.

The polling 426 may include instructions that, when executed by a processor, request data from the printing device 440 about activities occurring within the printing device 440. Such requests may be transmitted to the printing device 440 through the analytics service 430, in some embodiments. The data received from such polling may be used by the rules 424 to determine correlations and formulate rules.

The operations 427 may be instructions that, when executed by a processor, perform operations on the printing device 440 or the analytics service 430. Such operations may include accessing data stored within the information management service 410 to perform a task on the printing device 440 (e.g., requesting a technician be dispatched to the printing device 440 using the service dispatch 414). The operations 427 may receive tasks assigned from the tasks 424 based on implemented rules, for example.

The analytics service 430 may provide a user interface 432 for user interaction with the information management service 410, the computing device 420, or the printing device 440. For example, if the information management service 410, the computing device 420, or the printing device 440 are located remotely from the analytics service 430, the analytics service 430 may provide a terminal for user interaction (e.g., to accept, decline, modify, create, or suggest rules implemented on the printing device 440 or proposed by the computing device 420). The analytics service 430 may be implemented as a desktop computing device, a laptop computing device, a tablet computing device, or a mobile computing device, in various example embodiments. Alternatively, the analytics service 430 may be a browser-based service (e.g., implemented remotely on a server) that is device agnostic and accessible through a web browser. The analytics service 430 may include a user interface 432.

The user interface 432 may include instructions that, when executed by a processor of the analytics service 430, take input from and provide feedback to a user. The input may be communicated to other components of the printing device management system 400 (e.g., the computing device 420 or the printing device 440). Further the feedback may be provided by other components of the printing device management system 400 (e.g., the information management service 410, the computing device 420, or the printing device 440). The user interface 432 may include instructions that present a graphical user interface (GUI) on a screen (e.g., a touch panel) of the analytics service 430. The user interface 432 may also include instructions that translate user inputs (e.g., from a touch panel) into actions to be performed by the analytics service 430 (or any other component of the printing device management system 400). For example, in some embodiments, the user interface 432 may include instructions that present a formulated rule to a user (e.g., on a GUI) and ask the user whether to implement the rule. Based on the user's response, the user interface 432 may then transmit a notification to the computing device 420 indicating whether to implement the proposed rule. The user interface 423 may also accept input to set preferences or change settings within the computing device 420 (e.g., set thresholds used to determine whether two events are sufficiently correlated to warrant the creation of a rule). Further, the user interface 423 may also accept input to modify or remove from implementation previously implemented rules.

The printing device 440 may include a user interface panel 441, alerts 442, properties/settings 443, a printing unit 444, rules 445, a scanning unit 446, sensors 447, and a processor 448. The printing device 440 may be in a cluster, a network, or an organization, in various embodiments. For example, the printing device 440 may serve multiple users of multiple computing devices within an organization. Further, the printing device 440 may be similar to the printing device 102 illustrated in FIGS. 1 and 2 and contain components similar to the computing device components 300 illustrated in FIG. 3. One or more of the components of the printing device 440 may include instructions (e.g., software or firmware) executable by a processor (e.g., the processor 448) to perform certain functions.

The user interface panel 441 may be similar to the user interface 206 illustrated in FIG. 2, for example. For example, the user interface panel 441 may include a keyboard or a touch panel interface. The user interface panel 441 may take input from and provide feedback to a user. The input may be communicated to other components of the printing device management system 400 (e.g., the computing device 420 or the analytics service 430). Further the feedback to the user interface panel 441 may be provided by other components of the printing device management system 400 (e.g., the information management service 410, the computing device 420, or the analytics service 430). The user interface panel 441 may include instructions that translate user inputs (e.g., from a touch panel) into actions to be performed by the printing device 440 (or any other component of the printing device management system 400). For example, in some embodiments, the user interface panel 441 may include instructions that present a formulated rule on a GUI to a user and ask the user whether to implement the rule. Based on the user's response, the user interface panel 441 may transmit a notification to the analytics service 430 indicating whether to implement the proposed rule. The user interface panel 441 may also accept input to set preferences or change settings (e.g., the properties/settings 443) within the printing device 440 (e.g., set whether color toner or black toner should be used for a particular printing job). Further, the user interface panel 441 may also accept input to modify or remove from implementation previously implemented rules.

The alerts 442 may include instructions that, when executed, provide feedback to another device (e.g., the computing device 420 or the analytics service 430) or a user to indicate a status of the printing device 440. For example, such feedback may include indications displayed on a display of the user interface panel 441 (e.g., an error light illuminated) or a message transmitted to the analytics service 430.

The properties/settings 443 may include a list of preferences and/or settings for the printing device 440 stored within a memory of the printing device 440, for example. The preferences/settings 443 may include things like color vs. black toner, scan resolution, printing resolution (e.g., in dots per inch, dpi), normal mode vs. power conservation mode, etc. Further, the properties/settings 443 may also contain a list of properties/settings that affect how rules are implemented on the device (e.g., if two rules are triggered, and their resulting actions conflict, which should take precedence).

The printing unit 444 may be the component of the printing device that prints documents (e.g., converts digital data into physical media). The printing unit 444 may include a variety of components depending on what type of media the printing device 440 is configured to print to. For example, if the printing device 440 is configured to perform 3D printing, the printing unit 444 may include a plastic extrusion mechanism, one or more molds, an output chamber, etc. If the printing device 440 is configured to perform 2D printing, the printing unit 444 may include a toner-dispensing mechanism (e.g., a cartridge with an applicator), a paper-transfer mechanism (e.g., a drum), a toner-positioning mechanism (e.g., a set of gears and belts enabling the toner-dispensing mechanism to move in two dimensions with respect to a piece of paper), etc.

The rules 445 may include a set of instructions (e.g., executable by the processor 448) that, when executed, wait for trigger events based on previously defined rules. After the trigger event of a specific rule occurs, the rules 445 may contain instructions that cause a second event to occur (e.g., on the printing device 440). The rules 445 may be modified by the analytics server 430 (e.g., according to input from the user interface 432). In some embodiments, the printing device 440 may not include rules 445. For example, the rules 424 of the computing device 420 may monitor the printing device 440, and then, when a trigger event occurs, cause a response event to occur on the printing device 440 (e.g., via the analytics service 430). As indicated above, the rules 445 may be modified or deleted based on input received on the user interface panel 441, the user interface 432 of the analytics service 430, and/or the user interface 423 of the computing device 420.

The scanning unit 446 may be similar to the scanning element 208 illustrated in FIG. 2, for example. The scanning unit 446 may enable the printing device 440 to perform scanning actions (e.g., digitize a document by recording a physical document as a series of bits). The scanning unit 446 may be included on the printing device 440 if the printing device 440 is an MFP, for example. In some embodiments, the printing device 440 may instead be a scanning device (e.g., only the scanning unit 446 is present and not the printing unit 444).

The sensors 447 may provide feedback to a user of the printing device 440. Additionally or alternatively, the sensors 447 may assist the analytics service 430 and/or the computing device 420 in monitoring events occurring within the printing device 440 (e.g., to formulate rules based on correlations and/or to implement rules). Example sensors included within the sensors 447 are paper-drawer sensors (e.g., indicating when a paper drawer is opened or closed), scanning-unit sensors (e.g., indicating when a scanning unit is opened or closed), unplugged sensors, network connectivity sensors, Wi-Fi® sensors, BLUETOOTH® sensors, or toner sensors.

The processor 448 may be similar to the processor 302 described with respect to FIG. 3, for example. Alternatively, the processor 448 may be similar to a combination of all of the computing device components 300 illustrated in FIG. 3, in some embodiments. The processor 448 may be configured to execute instructions of the printing device 440 (e.g., stored within a memory of the printing device 440). For example, the processor 448 may execute instructions corresponding to firmware of the printing device 440 stored in memory.

III. Example Processes

Figure 5A:
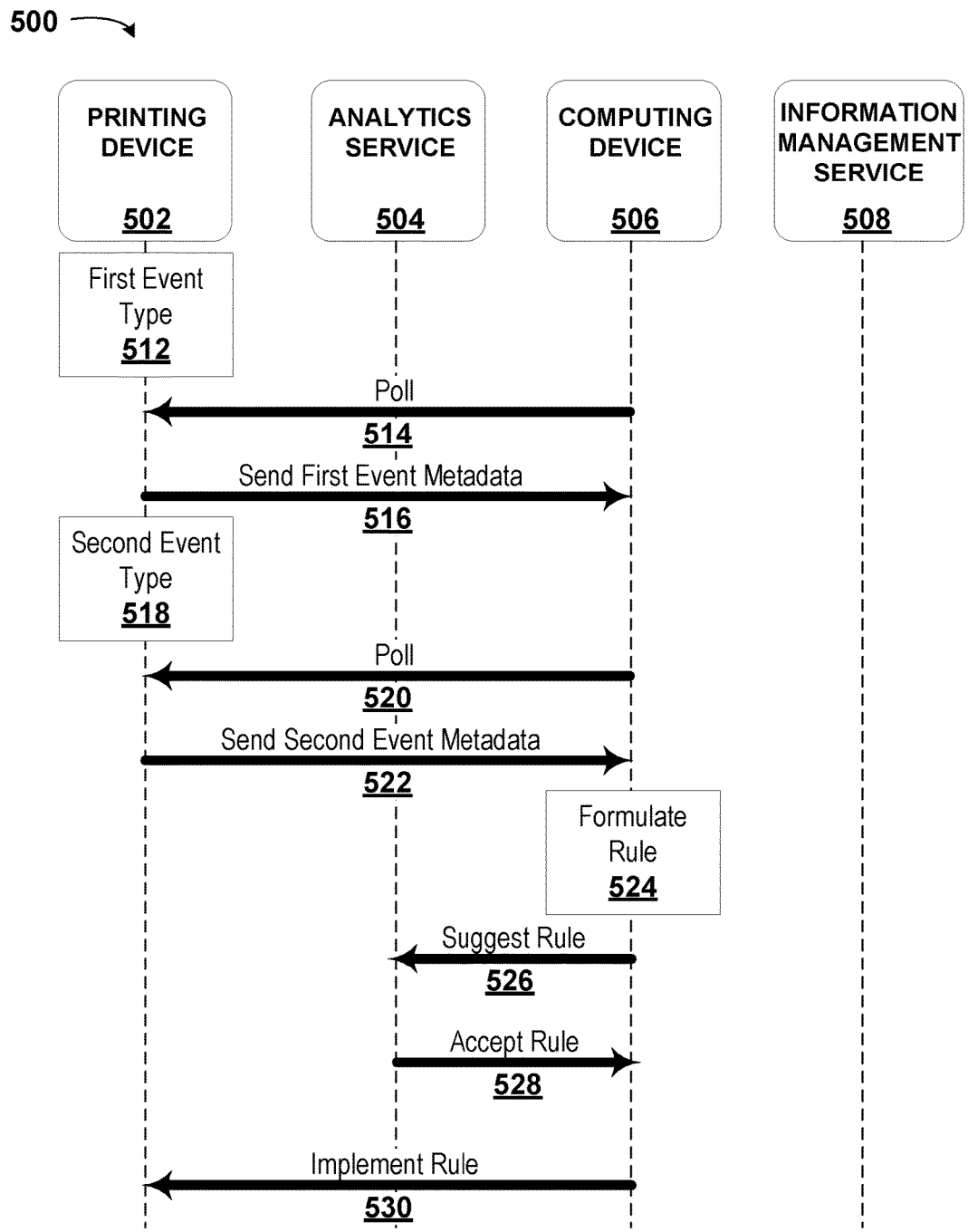
FIG. 5A is a data flow diagram, according to example embodiments.

FIG. 5A is a data flow diagram of a method 500, according to example embodiments. The data flow diagram illustrates actions, operations, and interactions among a printing device 502, an analytics service 504, a computing device 506, and an information management service 508. The printing device 502, the analytics service 504, the computing device 506, and the information management service 508 may be similar to the printing device 440, the analytics service 430, the computing device 420, and the information management service 410 illustrated in FIG. 4, for example.

At operation 512, the method 500 includes a first event type 512 occurring on the printing device 502. The first event type may include a wide variety of possible events within the printing device 502. For example, the first event type may include printing, scanning, copying, faxing, detecting low toner, replacing toner, detecting a clogged ink jet head, cleaning ink jet heads, detecting a paper jam, clearing paper jams, setting status alerts, powering on, powering off, reaching a specific time of day (e.g., 5:00 PM), reaching a specific date (e.g., January 1), reaching a specific black toner level or color toner level (e.g., 10% or less black toner remaining), discovering a new device attached/tethered to the printing device (e.g., a USB dongle or a BLUETOOTH® device), reaching a specific duration of inactivity (e.g., 30 minutes of inactivity), going to sleep, detecting a reduction in or an increase in printing rate (e.g., an increase in pages printed per day), detecting an increased or reduced network ping rate of the printing device, refilling paper, detecting a specific paper level (e.g., 5% or less of the paper reserve remaining), etc. While the first event type occurs on the printing device 502, the first event type may be initiated by the printing device 502 (e.g., powering on when plugged in) or by the computing device 506 (e.g., a user transmits a print request that is printed by the printing device 502).

At operation 514, the method 500 includes the computing device 506 polling the printing device 502. Polling the printing device 502 may include sending a request to the printing device 502 for data corresponding to events occurring within the printing device 502. The polling may occur at predetermined intervals. For example, the computing device 506 may poll the printing device 502 every ten minutes. At times when there have been no recent events within the printing device 502, the printing device 502 may respond with an indication that none of the signals have changed since the previous polling. Alternatively, if no recent events have occurred within the printing device 502, the printing device 502 may not respond at all. In some embodiments, a push model may be implemented (as opposed to the pull model). For example, the printing device 502 may send data to the computing device 506 at a predefined interval, rather than the computing device 506 requesting data.

At operation 516, the method 500 includes the printing device 502 sending first event metadata to the computing device 506. The first event metadata may include data signals associated with the printing device 502. For example, the first event metadata may include readings from a toner-level monitoring device or a paper-level monitoring device (e.g., a scale used to weigh the amount of paper within the printing device 502). In some embodiments, the first event metadata may be raw data (e.g., voltage or current readings), directly from various components of the printing device 502. In other embodiments, the printing device 502 may first translate the raw data into a value (e.g., a value representing the amount of remaining toner or number of sheets of paper remaining), and then send the message to the computing device 506 in response to the polling. Further, operation 516 may occur in response to the printing device 502 being polled by the computing device 506 at operation 514, for example.

At operation 518, the method 500 includes a second event type 518 occurring on the printing device 502. The second event type may include one or more of the possible events listed above with respect to operation 512. Other events are also possible. As with operation 512, the second event type may be initiated by a user (e.g., a print job may occur) or initiated by a computing device/printing device (e.g., printing device shuts itself down after specified duration of inactivity).

At operation 520, the method 500 includes the computing device 506 polling the printing device 502. Operation 520 may be equivalent to operation 514, but occur at a later time. If the computing device 506 polls the printing device 502 at predefined intervals, for example, operation 520 may occur at any multiple of intervals after operation 514 (e.g., 1, 5, 10, 100, or 500 intervals after operation 514). For example, the computing device 506 may poll the printing device 502 every 5.0 seconds. At a first time, the computing device 506 performs operation 514, to which the printing device 520 responds at operation 516. Then, the computing device 506 continues to poll the printing device 502 every 5.0 seconds for the next 5 hours without a response indicating a change in the printing device 502 metadata. Thereafter (e.g., on the six-hundredth polling), the printing device 502 responds with updated metadata (e.g., at operation 522).

At operation 522, the method 500 includes the printing device 502 sending second event metadata to the computing device 506. The second event metadata may include data signals associated with the printing device 502. For example, the second event metadata may include metadata from any of the categories with respect to the first event metadata described above. Similarly, the second event metadata may be raw data, directly from various components of the printing device 502. In other embodiments, the printing device 502 may first translate the raw data into a value and then send the value to the computing device 506 in response to the polling. Further, operation 522 may occur in response to the printing device 502 receiving a polling from the computing device 506 at operation 520, for example.

At operation 524, the method 500 includes the computing device 506 formulating a rule. Formulating a rule may include establishing a correlation between the first event type and the second event type. Additionally, formulating a rule may include comparing the correlation to a threshold to determine if a rule should be established (e.g., comparing the time between the first event type and the second event type to determine if they occurred within close enough proximity to warrant a rule being established). The rule formulated may indicate that when it is detected that the first event type has occurred, the second event type should be caused to occur (e.g., if an ink-jet head clog is detected, an ink-jet head cleaning process should be executed).

At operation 526, the method 500 includes the computing device 506 suggesting a rule to the analytics service 504 for implementation. The rule that is suggested to the analytics service 504 may be the rule that was formulated in operation 524. In some embodiments, suggesting the rule may include transmitting a message to the analytics service 504. The suggested rule may prompt the user to "accept" or "decline" the rule on a device (e.g., a tablet computing device or a mobile computing device" associated with the analytics service 504), for example. Additionally, a prompt of a user may be in the form of a pop-up notification (e.g., on a mobile computing device) or an email with multiple response links (e.g., one link to accept the implementation of the rule and one link to decline the implementation of the rule). Further, the analytics server 504 may allow a user to make modifications or adjustments to a rule before it is implemented. For example, if the proposed rule had a proposed first event (e.g., a proposed trigger event) that occurs when toner reaches 10% full, user input may be used to modified the rule such that the first event triggers on 15% toner, rather than 10%.

At operation 528, the method 500 includes the analytics service 504 accepting the rule suggested by the computing device 506. Accepting the rule may include the analytics service 504 transmitting an acceptance message to the computing device 506 (e.g., transmitting an indication that the rule should be implemented on the printing device 502). In some embodiments, accepting the rule may also include transmitting additional metadata about the rule to the computing device 506 (e.g., for what duration or under what conditions the rule should be acted on). In still other embodiments, a setting may have been chosen within the analytics service 504 to accept every suggested rule. This may lead to an acceptance flag or an indicator set within the analytics service 504. Hence, the computing device 506 may recognize that the computing device 506 does not need to wait for a response from the analytics service 504, but should simply move to operation 530.

At operation 530, the method 500 includes the computing device 506 implementing the rule on the printing device 502. In some embodiments, implementing the rule on the printing device 502 may include storing the rule within a memory of the printing device 502. Alternatively, implementing the rule on the printing device 502 may include associating the rule with the printing device (e.g., within the analytics service 504 or the computing device 506, such as within a device management software 422 as illustrated in FIG. 4). Further, implementing the rule may include the printing device 502 or the computing device 506 performing the second event type in response to the trigger of the first event type occurring. For example, after implementing the rule, if the first event type happens (e.g. a low color-toner level is detected within the printing device 502), the second event type may be caused to happen (e.g., a conversion to black-and-white-only printing on the printing device 502).

Figure 5B:
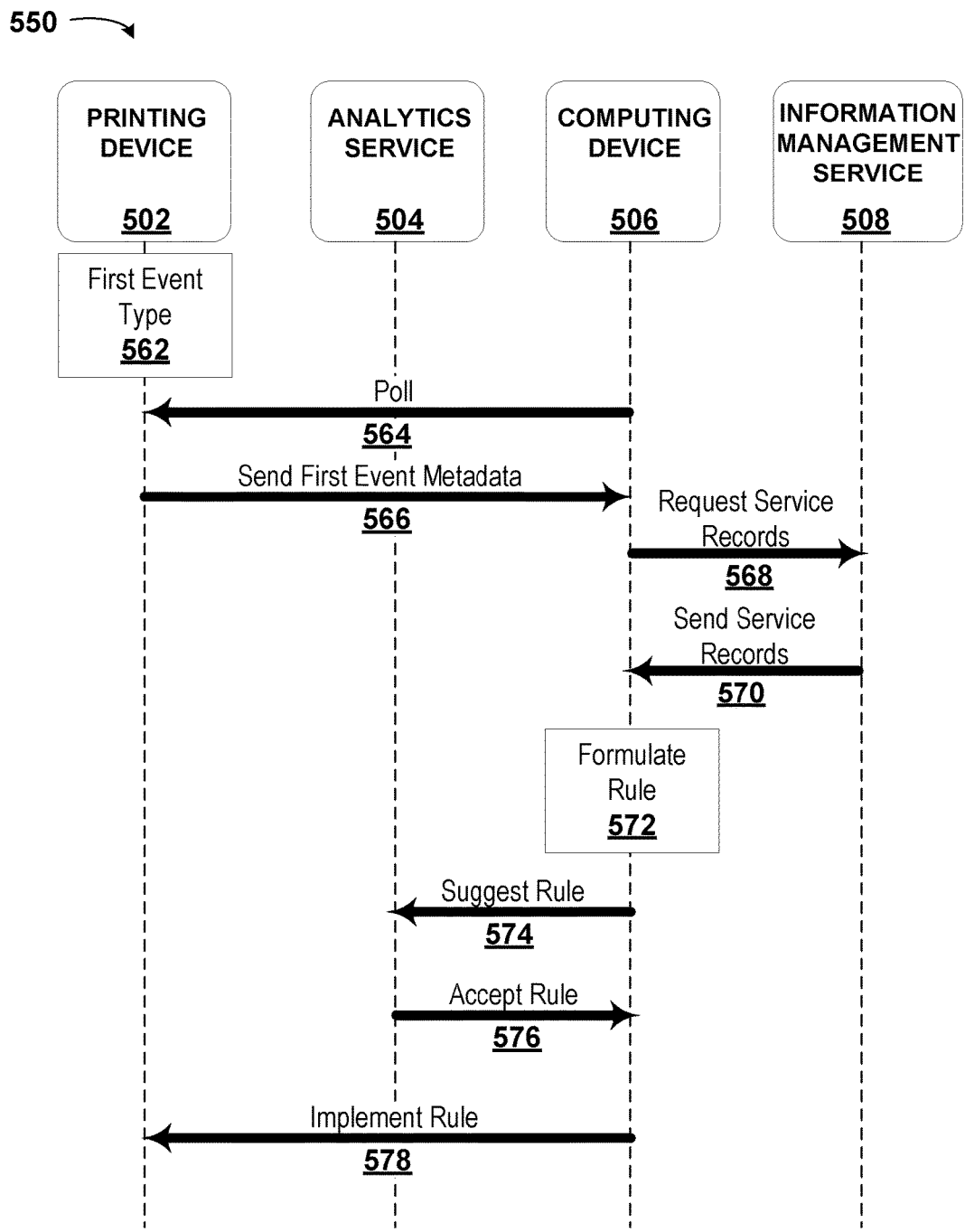
FIG. 5B is a data flow diagram, according to example embodiments.

FIG. 5B is a data flow diagram of a method 550, according to example embodiments. The data flow diagram illustrates actions, operations, and interactions among a printing device 502, an analytics service 504, a computing device 506, and an information management service 508. The printing device 502, the analytics service 504, the computing device 506, and the information management service 508 may be similar to the printing device 440, the analytics service 430, the computing device 420, and the information management service 410 illustrated in FIG. 4, for example.

At operation 562, the method 550 includes the first event type occurring on the printing device 502. Similarly to operation 512 illustrated in FIG. 5A, the first event type may include a wide variety of possible events occurring within the printing device 502. For example, the first event type may include printing, scanning, copying, faxing, replacing toner, detecting a clogged ink jet head, cleaning ink jet heads, detecting a paper jam, clearing paper jams, setting status alerts, powering on, powering off, reaching a specific time of day (e.g., 5:00 PM), reaching a specific date (e.g., January 1), reaching a specific black toner level or color toner level (e.g., 10% or less toner remaining), discovering a new device attached/tethered to the printing device (e.g., a USB dongle or a BLUETOOTH® device), reaching a specific duration of inactivity (e.g., 30 minutes of inactivity), going to sleep, detecting a reduction in or an increase in printing rate (e.g., printed pages per day), detecting an increased or reduced network ping rate of the printing device, refilling paper, detecting a specific paper level (e.g., 5% or less of the paper reserve remaining), etc. While the first event type occurs on the printing device 502, the first event type may be initiated by the printing device 502 (e.g., powering on when plugged in) or by the computing device 506 (e.g., a user transmits a print request that is printed by the printing device 502).

At operation 564, the method 550 includes the computing device 506 polling the printing device 502. In some embodiments, operation 564 may be analogous to operation 514 illustrated in FIG. 5A. For example, polling the printing device 564 may include sending a request to the printing device 502 for data corresponding to events occurring within the printing device 502.

At operation 566, the method 550 includes the printing device 502 sending first event metadata to the computing device 506. In some embodiments, operation 566 may be analogous to operation 516 illustrated in FIG. 5A. Similar to operation 516, the first event metadata may be raw data, directly from various components of the printing device 502. Alternatively, the printing device 502 may translate the raw data into a value, and then send the value to the computing device 502.

At operation 568, the method 550 includes the computing device 506 requesting service records from the information management service 508. In some embodiments, requesting service records 568 may include transmitting database requests to a server associated with (e.g., storing data of) the information management service 508. Such database requests may be sent using Structured Query Language (SQL), for example. The service records requested may be similar to the service records 412 illustrated in FIG. 4, for example.

At operation 570, the method 550 includes the information management service 508 sending service records to the computing device 506. The service records may include a log of events that have been performed with respect to the printing device 502 (e.g., by the analytics service 504 or by the computing device 506). For example, events requested/performed by a user may be contained within the service records. Example events within the service records include ordering replacement toner, dispatching a service technician, clearing of a paper jam, manually restarting the printer, contacting a manufacturer of the printing device 502 (e.g., to order replacement parts or inquire about the printing device 502), installing additional printing devices within an organization or network of the printing device 502, decommissioning printing devices within an organization or network of the printing device 502, replacing toner or paper within the printing device 502, etc.

At operation 572, the method 550 includes the computing device 506 formulating a rule. Formulating a rule may include establishing a correlation between a first event type and a second event type. Here, the first event type may be the first event type from operation 562, and the second event type may be one of the events contained within the service records transmitted in operation 570. Additionally, formulating a rule may include comparing the correlation to a threshold to determine if a rule should be established (e.g., comparing the time between the first event type and the second event type to determine if they are within close enough proximity to warrant a rule being established). The formulated rule may indicate that when it is detected that the first event type has occurred, the second event type should be caused to occur (e.g., if at least ten paper jams occur within the printing device 502 in one day, a service technician should be dispatched to the printing device 502).

At operation 574, the method 550 includes the computing device 506 suggesting the rule to the analytics service 504 for implementation. The rule that is suggested to the analytics service 504 may be the rule that was formulated in operation 572. Operation 574 may be analogous to operation 526. For example, the suggested rule may prompt the user to "accept" or "decline" the rule on a device.

At operation 576, the method 550 includes the analytics service 504 accepting the rule from the computing device 506. Operation 576 may be analogous to operation 528 illustrated in FIG. 5A. For example, accepting the rule may include the analytics service 504 transmitting an acceptance message to the computing device 506.

At operation 578, the method 550 includes the computing device 506 implementing the rule on the printing device 502. Operation 578 may be analogous to operation 530 illustrated in FIG. 5A. For example, implementing the rule on the printing device 502 may include storing the rule within a memory of the printing device 502.

Figure 6:
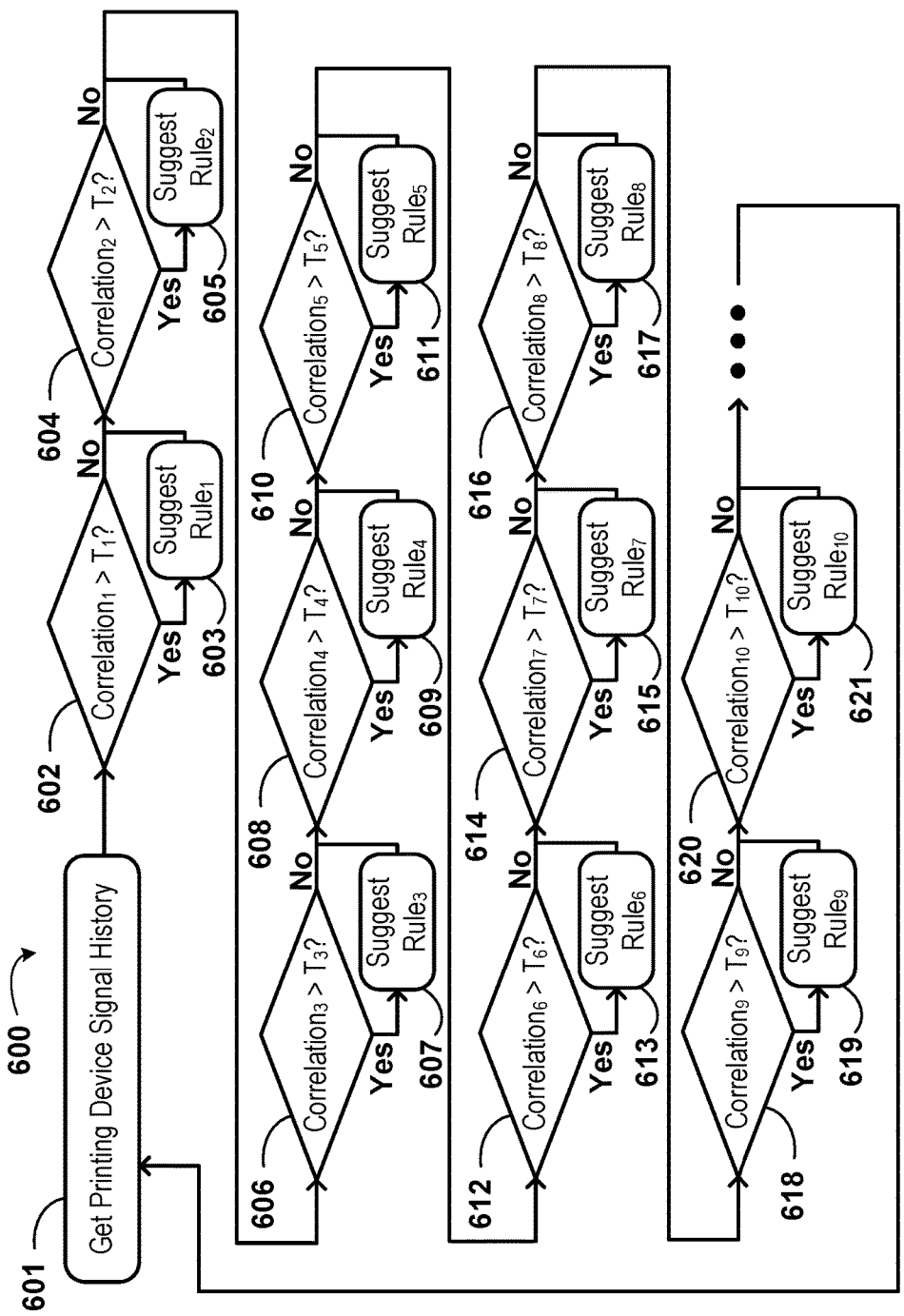
FIG. 6 is a flow chart illustrating a method, according to example embodiments.

FIG. 6 illustrates a method 600, according to example embodiments. The method 600 may be carried out by the system 400 illustrated in FIG. 4, for example.

At block 601, the method 600 may include getting a printing device signal history. The device signal history may include a list of values of different sensors (e.g., toner sensors) within a printing device. Further, the printing device signal history may include a list of one or more outgoing messages transmitted by the printing device or incoming messages received by the printing device. The printing device signal history may include signals related to events performed by the printing device (e.g., printing, scanning, etc.) or related to events performed by a user or a printing device management system on the printing device (e.g., clearing paper jams, resetting the printing device, remotely powering on/off the printing device, etc.).

The device signals retrieved in block 601 may be retrieved based on a polling of a printing device (e.g., by a computing device within a printing device management system). For example, the printing device may respond to a polling by transmitting a message that includes a file containing the device signal history of the printing device. Such a polling/response scheme may occur multiple times at predetermined intervals, in some embodiments (e.g., every five minutes, every hour, or once a day). In alternate embodiments, rather than polling the printing device for the device signal history, the printing device may continuously transmit device signals to the computing device (e.g., values from a sensor indicating how much toner remains in the printing device). The signals may be pre-processed for noise (e.g., by the printing device or by the computing device). Then, the computing device itself may maintain a log of the printing device signal history to track events occurring over time. A tracking of toner level may yield a plot similar to that illustrated in FIG. 8, for example.

Additionally, the printing device signal history may be used by a computing device of the printing device management system to determine correlations among two or more events. Such a correlation may include the time difference between when a paper jam occurs and when it is cleared, for example. These correlations may then be compared to threshold values as described herein. The comparison to threshold values may prevent "false positives" from arising in a printing device management system. As an example, even if two events occur in close temporal proximity to one another once, they may not necessarily occur within close temporal proximity more than once. Thus, the two events may occur completely independently of one another and do not warrant the implementation of a rule. Thus, using a threshold to determine if the correlation is sufficient may prevent such events from leading to the creation of a rule. In some embodiments, an event type can be a part of more than one, or even all, of the following correlations.

At block 602, the method 600 may include determining whether $correlation_1$ is greater than a threshold ($T_1$). If $correlation_1$ is greater than $T_1$, the method 600 may proceed to block 603. If $correlation_1$ is not greater than $T_1$, the method 600 may proceed to block 604. In some embodiments, $correlation_1$ may correspond to an association between a first event type that is associated with one or more printing devices (e.g., toner level crosses below a threshold value of 5%) and a second event type that is associated with one or more printing devices (e.g., the toner is replaced by a technician). Additionally, $T_1$ may correspond to a certain percentage of times in which the second event type occurs within a specified time of the first event type (e.g., 50% of the time the toner is replaced by a technician within seven days of the toner level crossing below the threshold value of 5%).

At block 603, the method 600 may include suggesting a rule ($rule_1$). Suggesting $rule_1$ may include formulating $rule_1$. $Rule_1$ may be based on $correlation_1$, for example. Further, $rule_1$ may be based on a calculation of a difference between $correlation_1$ and $T_1$. Suggesting $rule_1$ may also include displaying $rule_1$ to a user and requesting acceptance of implementation of $rule_1$. Taking the example presented in block 602, $rule_1$ may include dispatching a technician to the associated printing device upon the toner level crossing below the threshold value of 5%.

At block 604, the method 600 may include determining whether $correlation_2$ is greater than a threshold ($T_2$). If $correlation_2$ is greater than $T_2$, the method 600 may proceed to block 605. If $correlation_2$ is not greater than $T_2$, the method 600 may proceed to block 606. In some embodiments, $correlation_2$ may correspond to a first event type that is associated with one or more printing devices and a second event type that is associated with one or more printing devices. The two event types in $correlation_2$ may be rates involving events per unit time. For example, $correlation_2$ may correspond to a number of pages printed per hour (first event type) correlated to a number of paper jams per hour (second event type). Additionally, $T_2$ may correspond to a specific linear relationship between the first event type and the second event type. For example, if when the first event type increases by a certain rate (e.g., 60 pages printed per hour) the second event type increases by a corresponding, relative rate (e.g., at least 3 paper jams per hour), $T_2$ may be satisfied. Said another way, if a regression line is plotted with the first event type on one axis and the second event type on an orthogonal axis, $T_2$ may correspond to a threshold slope of the regression line (e.g., 3/60, or 0.05, jams/page printed). If more than 0.05 jams/page printed occur, block 604 may determine that $correlation_2$ is sufficiently correlated to overcome the threshold, for example.

At block 605, the method 600 may include suggesting a rule ($rule_2$). Suggesting $rule_2$ may include formulating $rule_2$. $Rule_2$ may be based on $correlation_2$, for example. Further, $rule_2$ may be based on a calculation of a difference between $correlation_2$ and $T_2$. Suggesting $rule_2$ may also include displaying $rule_2$ to a user and requesting acceptance of implementation of $rule_2$. Taking the example presented in block 604, $rule_2$ may include executing a check for paper jam method and/or a clear paper jam method on an associated printing device for every 20 pages printed by the associated printing device. Alternatively, if $correlation_2$ is significantly larger than $T_2$ (e.g., there are 1.0 jams/page printed), $rule_2$ may only allow printing using the associated printing device if every other printing device within an organization of the associated printing device is currently unavailable.

At block 606, the method 600 may include determining whether $correlation_3$ is greater than a threshold ($T_3$). If $correlation_3$ is greater than $T_3$, the method 600 may proceed to block 607. If $correlation_3$ is not greater than $T_3$, the method 600 may proceed to block 608. In some embodiments, $correlation_3$ may include an event of a first event type that is associated with a printing device and a second event type that is associated with the printing device. For example, the first event type may include a print job being active for 10 minutes on the printing device and the second event type may include paper being replaced in the printing device in response to an out of paper indication. $T_3$ may include a time associated with the first event type before the second event type occurs (e.g., a print job was active on the printing device for at least 5 minutes before paper was replaced).

At block 607, the method 600 may include suggesting a rule ($rule_3$). Suggesting $rule_3$ may include formulating $rule_3$. $Rule_3$ may be based on $correlation_3$, for example. Further, $rule_3$ may be based on a calculation of a difference between $correlation_3$ and $T_3$. Suggesting $rule_3$ may also include displaying $rule_3$ to a user and requesting acceptance of implementation of $rule_3$. $Rule_3$ may include transmitting an out of paper indication to a user when the printing device has had a print job active for 5 minutes, for example.

At block 608, the method 600 may include determining whether $correlation_4$ is greater than a threshold ($T_4$). If $correlation_4$ is greater than $T_4$, the method 600 may proceed to block 609. If $correlation_4$ is not greater than $T_4$, the method 600 may proceed to block 610. In some embodiments, $correlation_4$ may correspond to a first event type that is associated with one or more printing devices and a second event type associated with the one or more printing devices. The first event type may include a certain time of day or week being reached (e.g., Friday at 5:00 PM) and the second event type may correspond to powering off the associated printing device(s). Further, $correlation_4$ may include a log of how many times in the last year the associated printing device(s) were powered off on Friday at 5:00 PM (e.g., powered off within 15 minutes of 5:00 PM). Further, $T_4$ may correspond to a threshold fraction when the powering off occurred (e.g., 30 out of the previous 52 weeks the associated printing device(s) were powered off within 15 minutes of 5:00 PM on Friday).

At block 609, the method 600 may include suggesting a rule ($rule_4$). Suggesting $rule_4$ may include formulating $rule_4$. $Rule_4$ may be based on $correlation_4$, for example. Further, $rule_4$ may be based on a calculation of a difference between $correlation_4$ and $T_4$. Suggesting $rule_4$ may also include displaying $rule_4$ to a user and requesting acceptance of implementation of $rule_4$. $Rule_4$ may include the associated printing device(s) powering themselves off every Friday at 5:00 PM. Alternatively, $rule_4$ may include the printing device manager transmitting an instruction to the associated printing device(s) at 5:00 PM on Fridays indicating that the associated printing device(s) should be powered off.

At block 610, the method 600 may include determining whether $correlation_5$ is greater than a threshold ($T_5$). If $correlation_5$ is greater than $T_5$, the method 600 may proceed to block 611. If $correlation_5$ is not greater than $T_5$, the method 600 may proceed to block 612. In some embodiments, $correlation_5$ may correspond to a first event type that is associated with one or more printing devices and a second event type that is associated with one or more printing devices. The first event type may correspond to a change (e.g., increase or decrease) in a rate of pages printed per unit time. In some embodiments, calculating such a correlation may include calculating a derivative of the pages printed per unit time. For example, the first event type may correspond to an increase from 50 pages printed per hour to 100 pages printed per hour. The second event type may correspond to a malfunction in a different printing device. Thus, correlations may indicate that, because another printing device within an organization is unavailable for use, users desiring to print a document have migrated their printing jobs to the printing device associated with the first event type. Further, $T_5$ may represent a threshold increase (or decrease) in the number of pages printed per hour (e.g., $T_5$ may be equivalent to an increase of 50 pages per hour within the span of one hour, i.e., 50 pages/hour/hour).

At block 611, the method 600 may include suggesting a rule ($rule_5$). Suggesting $rule_5$ may include formulating $rule_5$. $Rule_5$ may be based on $correlation_5$, for example. Further, $rule_5$ may be based on a calculation of a difference between $correlation_5$ and $T_5$. Suggesting $rule_5$ may also include displaying $rule_5$ to a user and requesting acceptance of implementation of $rule_5$. $Rule_5$, for example, may include dispatching a technician to the printing device associated with the second event type when the first event type occurs (e.g., dispatch a technician to the second printing device when the pages printed increases by at least 50 pages per hour within the span of one hour or less).

At block 612, the method 600 may include determining whether $correlation_6$ is greater than a threshold ($T_6$). If $correlation_6$ is greater than $T_6$, the method 600 may proceed to block 613. If $correlation_6$ is not greater than $T_6$, the method 600 may proceed to block 614. In some embodiments, $correlation_6$ may include a first event type that is associated with a printing device and a second event type that is associated with the printing device. For example, the first event type may be a change in the time duration since being powered on when the printing device receives its first print request (e.g., typically, within 30 minutes of being powered on, a print request is received, but the first event type includes 3 hours of being powered on and then receiving a print request). The second event type may include a technician being dispatched to the printing device to assess the printing device's network controller, for example. $T_6$, in such an example, may be a change of a length in time (e.g., $T_6$ represents a two-hour difference between the standard timing and the first event timing).

At block 613, the method 600 may include suggesting a rule ($rule_6$). Suggesting $rule_6$ may include formulating $rule_6$. $Rule_6$ may be based on $correlation_6$, for example. Further, $rule_6$ may be based on a calculation of a difference between $correlation_6$ and $T_6$. Suggesting $rule_6$ may also include displaying $rule_6$ to a user and requesting acceptance of implementation of $rule_6$. $Rule_6$ may include dispatching a technician to the printing device if a print request has been detected within 3 hours of powering on, for example.

At block 614, the method 600 may include determining whether $correlation_7$ is greater than a threshold ($T_7$). If $correlation_7$ is greater than $T_7$, the method 600 may proceed to block 615. If $correlation_7$ is not greater than $T_7$, the method 600 may proceed to block 616. In some embodiments, $correlation_7$ may include a first event type that is associated with multiple printing devices within an organization and a second event type that is associated with the printing devices in the organization. For example, the first event type may include a number of total pages printed by a respective printing device (e.g., 1 million pages) and the second event type may include a decommissioning of the respective printing device within the organization within a certain number of pages of the first event type (e.g., decommissioning the respective printing device at 1 million pages printed +/−50,000 pages). $T_7$, then, may include a threshold number of occurrences of the first event type where the second event type also occurs (e.g., $T_7$ may correspond to the number of times a printing device has reached 1 million pages printed and been decommissioned between 950,000 and 1,050,000 pages printed). For example, 50% of the time a printing device reaches 1 million pages printed, it is decommissioned within 50,000 pages printed of 1 million pages printed.

At block 615, the method 600 may include suggesting a rule ($rule_7$). Suggesting $rule_7$ may include formulating $rule_7$. $Rule_7$ may be based on $correlation_7$, for example. Further, $rule_7$ may be based on a calculation of a difference between $correlation_7$ and $T_7$. Suggesting $rule_7$ may also include displaying $rule_7$ to a user and requesting acceptance of implementation of $rule_7$. $Rule_7$ may include, for each printing device within an organization, ordering a new printing device to replace the corresponding printing device once the corresponding printing device has printed 1 million pages.

At block 616, the method 600 may include determining whether $correlation_8$ is greater than a threshold ($T_8$). If $correlation_8$ is greater than $T_8$, the method 600 may proceed to block 617. If $correlation_8$ is not greater than $T_8$, the method 600 may proceed to block 618. In some embodiments, $correlation_8$ may include a first event type associated with a printing device and a second event type associated with the printing device, where both the first event type and the second event type are performed on the printing device (as opposed to by the printing device). For example, the first event type may include receiving a firmware upgrade notification from a computing device and the second event type may include locking the printing device, by the computing device, to prevent interference with the firmware upgrade. In such embodiments, $T_8$ may include a time duration between the two events (e.g., if the second event type, the locking of the printing device, occurs within 100 ms of the first event type, receiving a firmware upgrade notification from the computing device, $T_8$ may be satisfied).

At block 617, the method 600 may include suggesting a rule ($rule_8$). Suggesting $rule_8$ may include formulating $rule_8$. $Rule_8$ may be based on $correlation_8$, for example. Further, $rule_8$ may be based on a calculation of a difference between $correlation_8$ and $T_8$. Suggesting $rule_8$ may also include displaying $rule_8$ to a user and requesting acceptance of implementation of $rule_8$. $Rule_8$ may include the printing device locking in response to receiving a firmware upgrade notification from a computing device.

At block 618, the method 600 may include determining whether $correlation_9$ is greater than a threshold ($T_9$). If $correlation_9$ is greater than $T_9$, the method 600 may proceed to block 619. If $correlation_9$ is not greater than $T_9$, the method 600 may proceed to block 620. In some embodiments, $correlation_9$ may include a first event type occurring on an associated printing device and a second event type occurring on the associated printing device. For example, the first event type could be scanning a page using the printing device and the second event type could be emailing the scanned page to a standard email address (e.g., based on a manual selection by a user). $T_9$ may include a duration of time within which the email is sent (e.g., if the email is sent within 30 seconds, the threshold of $T_9$ may have been met).

At block 619, the method 600 may include suggesting a rule ($rule_9$). Suggesting $rule_9$ may include formulating $rule_9$. $Rule_9$ may be based on $correlation_9$, for example. Further, $rule_9$ may be based on a calculation of a difference between $correlation_9$ and $T_9$. Suggesting $rule_9$ may also include displaying $rule_9$ to a user and requesting acceptance of implementation of $rule_9$. $Rule_9$ may include sending an email, by the printing device, to the standard email address with the scanned image whenever an image is scanned by the printing device.

At block 620, the method 600 may include determining whether $correlation_{10}$ is greater than a threshold ($T_{10}$). If $correlation_{10}$ is greater than $T_{10}$, the method 600 may proceed to block 621. In some embodiments, $correlation_{10}$ may correspond to a first event type or a second event type that is associated with a printing device and a third event type that is associated with the printing device. For example, the first event type may be the printing device printing 100,000 pages and the second event type may be the printing device reaching one year of service since installation. Further, the third event type may be maintenance performed on the printing device. Hence, $T_{10}$ may include the percentage of the time the first event type occurred or the second event type occurred and the third event type occurred within a predetermined period of time (e.g., $T_{10}$ represents the threshold percentage of the time, such as 50%, that maintenance is performed on the printing device within one month of the printing device reaching a year old or within one month of the printing device printing 100,000 pages).

At block 621, the method 600 may include suggesting a rule ($rule_{10}$). Suggesting $rule_{10}$ may include formulating $rule_{10}$. $Rule_{10}$ may be based on $correlation_{10}$, for example. Further, $rule_{10}$ may be based on a calculation of a difference between $correlation_{10}$ and $T_{10}$. Suggesting $rule_{10}$ may also include displaying $rule_{10}$ to a user and requesting acceptance of implementation of $rule_{10}$. $Rule_{10}$ may include contacting a maintenance facility or worker in response to a printing device reaching one year old or printing its $100,000^{th}$ page.

It is understood that the correlations and thresholds described above are by way of example. Other correlations and threshold are also possible in various embodiments. Also, as illustrated by the three dots after block 621 in FIG. 6, the method 600 may include a variety of additional correlations being compared with additional thresholds before returning to block 601. Alternatively, in some embodiments, fewer correlations may be compared to fewer thresholds. For example, in one embodiment, only one correlation may be compared to one threshold before returning to block 601.

As another alternate embodiment, the correlations may be compared to the thresholds only until a correlation that exceeds a threshold is found. For example, if $correlation_4$ is greater than $threshold_4$, the method 600 may end and only $correlation_4$ may be used to formulate a rule. In still other embodiments, one or more comparisons could be made to determine if the correlation is less than, rather than greater to, a threshold. For example, an amount of time between events of a given correlation (e.g., the amount of time after toner drops below 10% that it takes for new toner to be ordered) may be compared to a threshold time (e.g., 24 hours) to determine if the correlation is below a given threshold.

In some embodiments, a user may be able to set the threshold values. For example, a user interface on an analytics device may provide controls for adjusting how correlated two events must be in order to formulate a rule based on the two correlated events. Further, in some embodiments, the correlations may be among three or more events, rather than only two. For example, a correlation may be between a power on event, a number of printed pages, and a power off event. The correlation may include a determination of pages printed per unit time based on the time between the power on event and the power off event and the number of printed pages. This value (pages printed per unit time) may be compared to a threshold number of pages printed per unit time, for example.

Figure 7A:
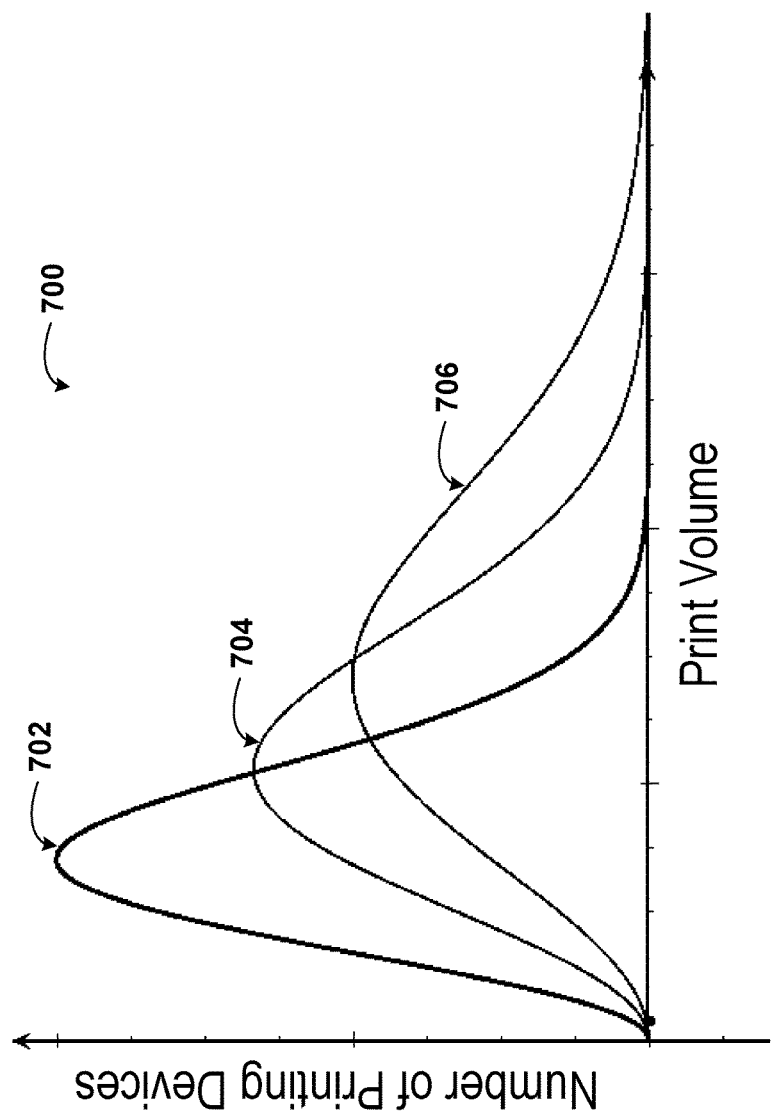
FIG. 7A is an example of printing distributions for various organizations, according to example embodiments.

FIG. 7A is a plot 700 of printing distributions for various organizations. The plot 700 includes a low-print-volume curve 702, a medium-print-volume curve 704, and a high-print-volume 706 curve. The curves 702, 704, 706 represent Boltzmann distributions for their respective organizations. In other embodiments, Gaussian distributions may instead be used as a model. In still other embodiments, other statistical distributions may be used (e.g., various distributions that are used to represent particles in a system that occupy various states may be used). The plot 700 illustrates the number of printing devices printing at a given print volume across a range of print volumes. The plot 700 may assume the same number of printing devices within each of the three organizations illustrated, for example.

In some embodiments, rather than number of printing devices, the probability of a given printing device having a print volume may be plotted on the vertical axis. In such embodiments, an assumption of the same number of printing devices across the organizations may not be used.

The curves 702, 704, 706 illustrated in FIG. 7A may be used by a computing device when formulating a rule regarding the printing within an organization. Additionally or alternatively, the curves 702, 704, 706 may be used to modify an existing rule (e.g., when an additional printing device is added to an organization). For example, when a printing device is added to a network of an organization, it may be assumed that the added printing device will be used more than the mean printing device in the organization (e.g., because it is new and has increased capabilities compared to the older printing devices). For instance, it may be assumed that the added printing device will have a print volume one standard deviation above the mean. Other locations within the distributions for added printing devices are also possible.

Figure 7B:
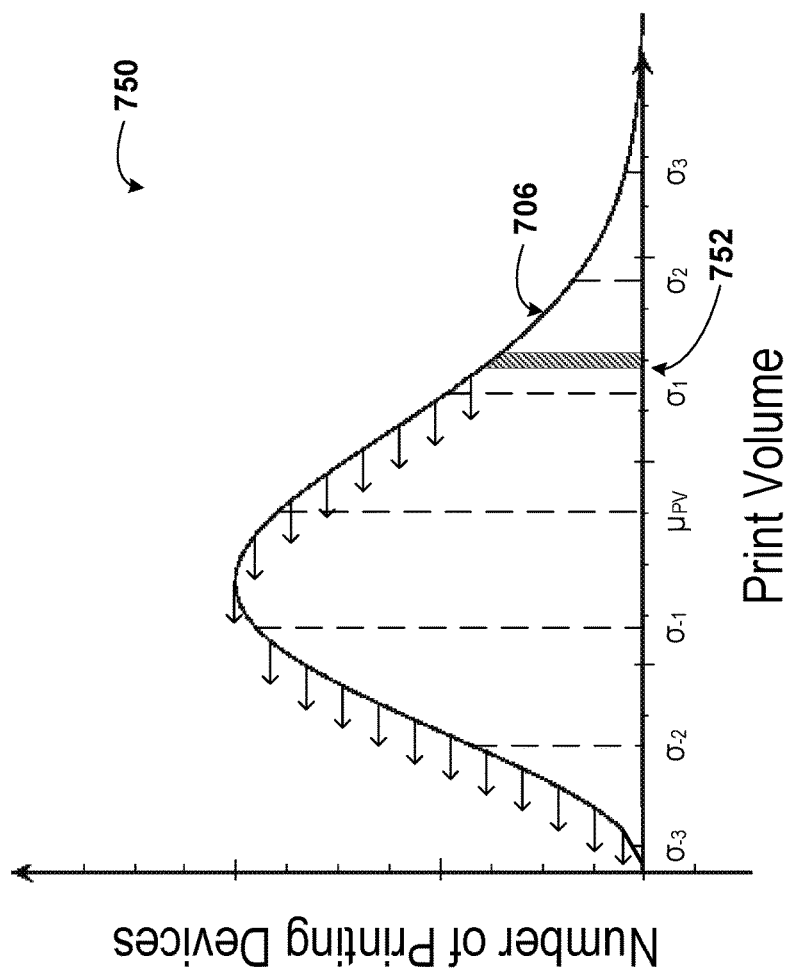
FIG. 7B is an example of a shift in a printing distribution within an organization, according to example embodiments.

When the printing device is added, it may be inserted into the respective organizational distribution at one standard deviation above the mean. Thereafter, the other printing devices within the distribution may shift locations along the curve (e.g., the printing devices at or below the first standard deviation above the mean may shift down to lower printing volumes), assuming that the organization is a closed system. The shift may be as illustrated for the high-print-volume curve 706 in the plot 750 illustrated in FIG. 7B (e.g., the addition of a printing device 752 may cause the distribution to shift in the ways indicated by the arrows). Such an addition of a new printing device may modify the print volume of as few as one other printing device within the organization or as many as all other printing devices within the organization. Further, where the added printing device is inserted into the distribution may depend on specifications of users within the particular organization, specifications of the printing device to be added, and/or specifications of other printing devices within the particular organization.

Such information may be used to modify rules in the following way. A printing device at the mean print volume may have had paper jams cleared or toner cartridges replaced after a predefined period of time. However, after the addition of a new printing device in the organization, the printing device previously at the mean may now have a lower print volume. Thus, the predefined period of time at which paper jams are cleared or toner cartridges are replaced may be extended, as service might not be required as frequently now. Other ways of modifying rules based on the organizational distribution are also possible.

Similarly, when a printing device is decommissioned (e.g., permanently removed from the organization), the curves 702, 704, 706 may also adjust. For example, if a printing device is decommissioned that was at the second standard deviation above the mean, one or more other printing devices within the organization may have to increase printing volume to compensate for this.

Figure 7C:
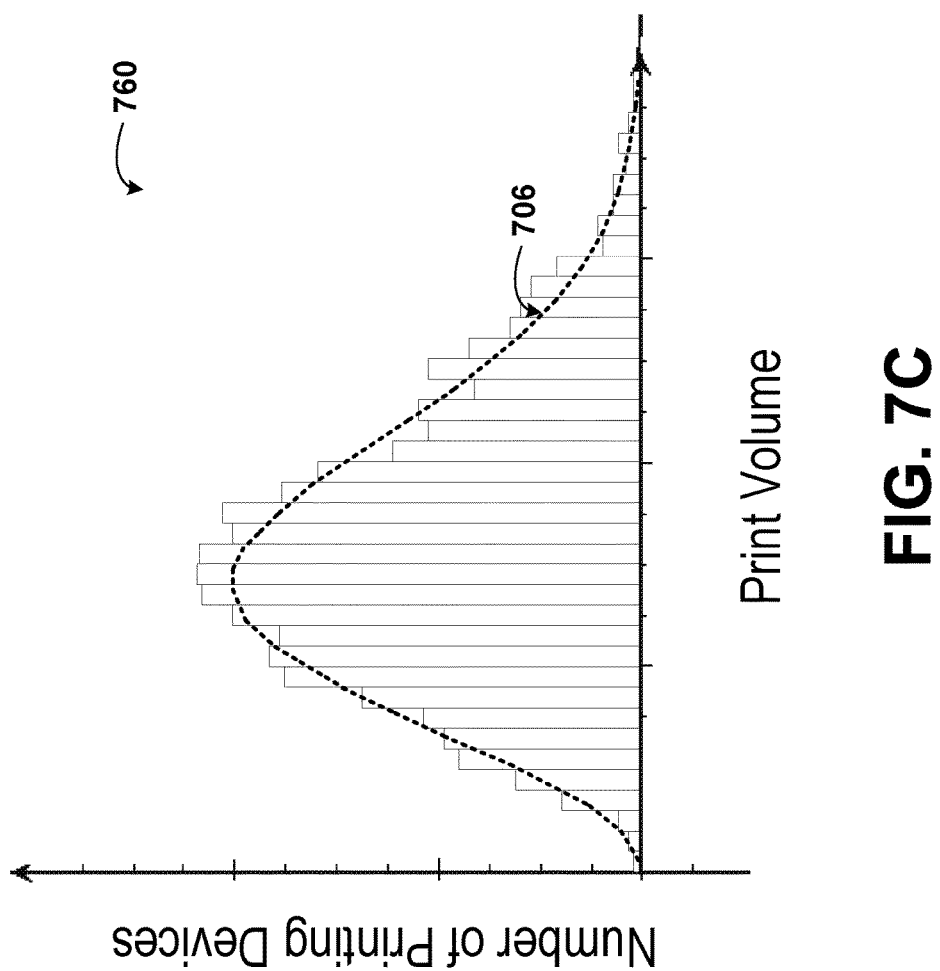
FIG. 7C is an example of a histogram used to fit a printing distribution for an organization, according to example embodiments.

The Boltzmann distributions, as represented by the curves 702, 704, 706, for the three organizations illustrated in FIG. 7A may be determined based on histograms of current usage of printing devices. For example, as illustrated in FIG. 7C, a monthly survey may be performed across all printing devices within an organization. The survey may record the printing volume of each printing device within an organization over the last month, and use those printing volumes to generate a histogram (e.g., the histogram 760 illustrated in FIG. 7C). The histogram may then be fit to a distribution (e.g., a Boltzmann distribution) to determine a state of the organization (e.g., high-volume, mid-volume, or low-volume state). The state of the organization may roughly correspond to temperature in a canonical Boltzmann distribution of particles (e.g., gas particles). As illustrated in FIG. 7C, a generated histogram can result in the high-print-volume curve 706 being fit to the distribution. The survey may be periodically updated (e.g., based on the most recent month's printing volume data from the printing devices), the updated survey may be used to generate an updated histogram and an updated Boltzmann distribution.

Based on the updated distribution/histogram, certain rules with respect to printing devices in the organization may also be upgraded (e.g., if a printing device is now near the top of an organizational distribution, rather than the bottom, the printing device may have service technicians dispatched more frequently to ensure proper functioning of the device).

Figure 8:
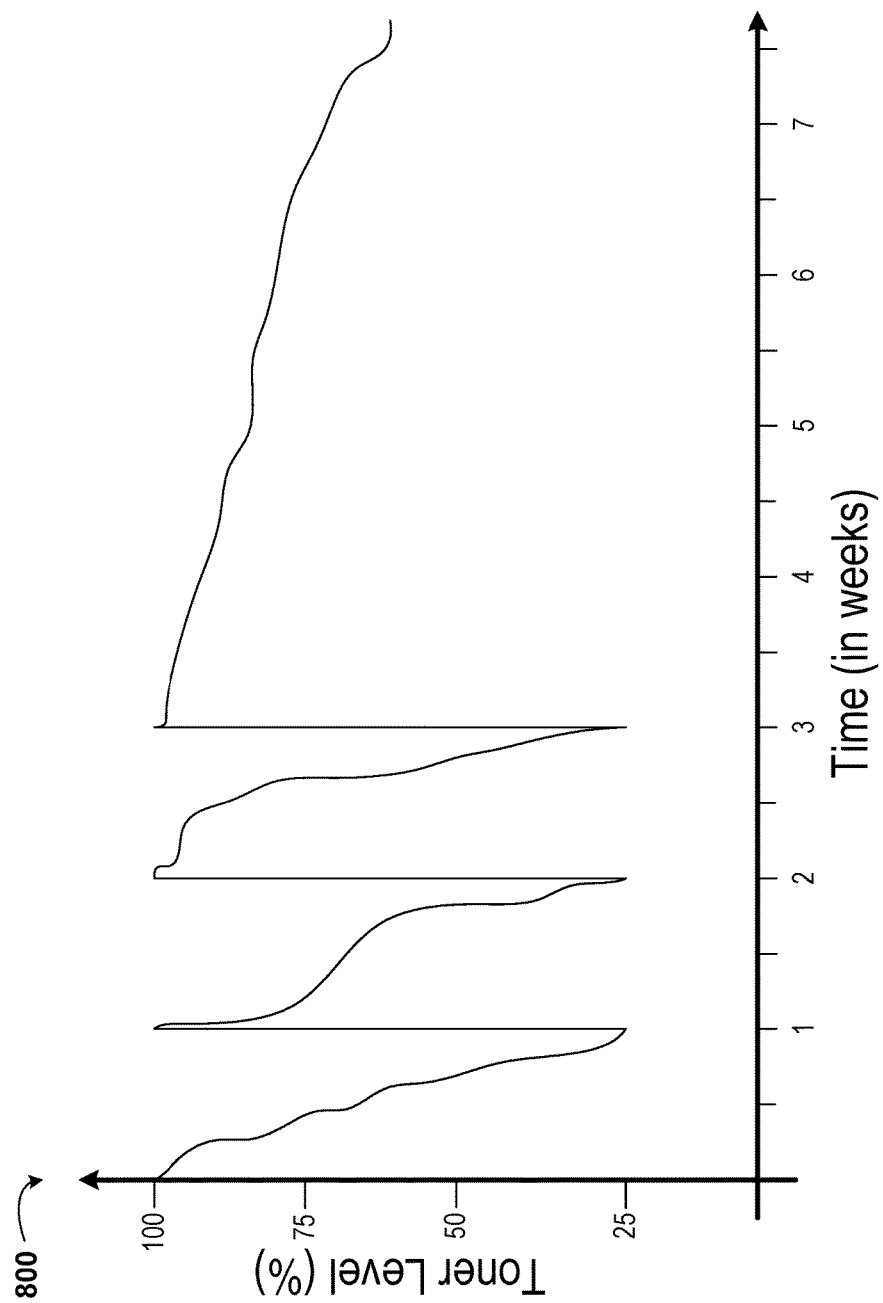
FIG. 8 is an example toner level evolution over time for a printing device within an organization, according to example embodiments.

FIG. 8 is a plot 800 of toner level (measured in percentage filled) versus time (measured in weeks) for a printing device within an organization. The plot 800 may be stored within the printing device, in some embodiments. Alternatively, the plot 800 may be generated by a corresponding computing device based on device signals received from the printing device. The plot 800 illustrates the change in toner level over time, as well as highlights inconsistent toner usage. The sharp vertical upticks in toner (e.g., at week 1, week 2, and week 3) may correspond to a replacement of a toner cartridge within the respective printing device. Thus, when the toner cartridge is replaced with a new, full toner cartridge, the toner level returns to 100%.

Further, the decreased use of toner (illustrated by the less dramatically decreasing section of the plot 800 beginning at week 3) may correspond to a first event or a second event within a correlation used in the formulation of a rule. For example, the decreased use of toner may indicate some employees within the organization being on vacation or another printing device being added to the printing organization. Alternatively, the decreased use of toner may indicate an issue with the printing device (e.g., firmware requires updating, network communication failure, lack of internet connectivity, clogged toner head, password access to the printing device has changed, etc.).

Taking the plot 800 as an example, a first event may correspond to the toner level reaching 25%. Further, the second event may correspond to a replacement of a toner cartridge (e.g., causing the toner level to rise back to 100%). This could be implemented as a rule within the printing device (e.g., after week 2). For example, upon the toner reaching 25%, a technician is dispatched to the printer to replace the toner cartridge or an alert indicating low toner is sent to a computing device. Thus, in week 3, the toner cartridge is replaced in response to the toner level reaching 25%. After week 3, the toner level has yet to reach 25% again. Thus, the toner cartridge has yet to be replaced.

As an alternate example using plot 800, a first event may correspond to the end of a week (e.g., end of week 1) and a second event may correspond to a replacement of a toner cartridge (e.g., causing the toner level to rise back to 100%). This could be implemented as a rule within the printing device (e.g., after week 2). Such a rule may include replacing the toner cartridge in the printing device at the end of every week. However, a computing device could receive an indication that the rule should no longer be implemented (e.g., an indication from a user that the rule is no longer required). Thus, after weeks 4, 5, 6, and 7, the toner cartridge is not replaced, and the toner level does not revert to 100%.

Figure 9:
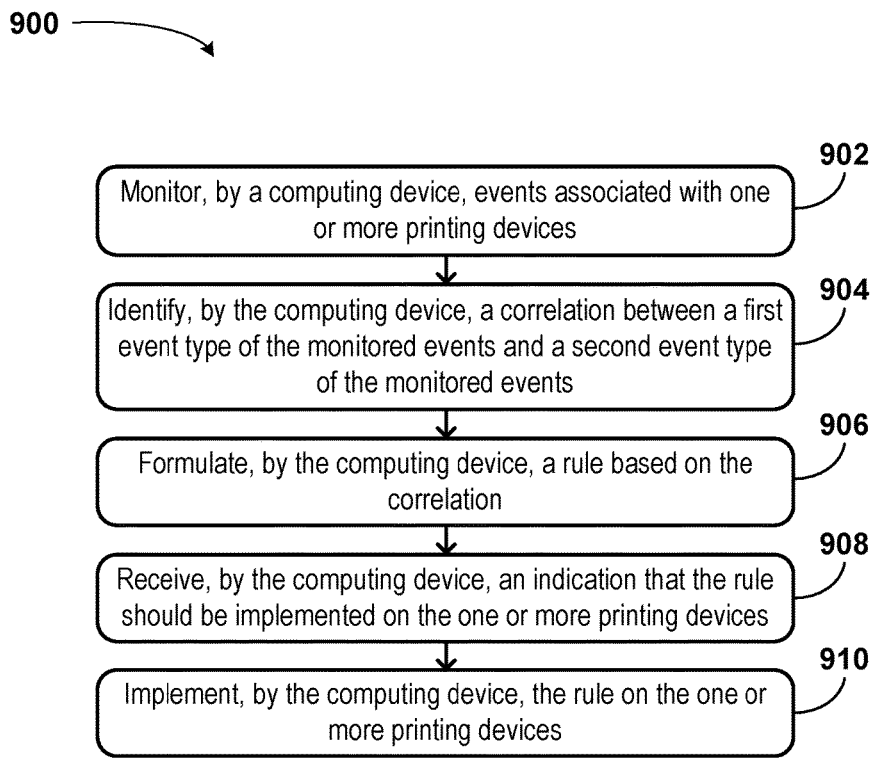
FIG. 9 is a flow chart illustrating a method, according to example embodiments.

FIG. 9 is an illustration of a method 900, according to example embodiments. The method 900 may be performed by a printing device management system (e.g., the printing device management system 400 illustrated in FIG. 4), in some embodiments.

At block 902, the method 900 includes monitoring, by a computing device, events associated with one or more printing devices. The events may include activities performed by the one or more printing devices (e.g., printing, scanning, copying, faxing, changing toner, cleaning ink jet heads, clearing paper jams, setting alerts, powering on, powering off, etc.). Additionally or alternatively, the events may include requests transmitted from a user to the one or more printing devices (e.g., a print request, a scan request, a copy request, a fax request, a settings change, a power off request, a power on request, a reset request, a service request, a firmware upgrade request, etc.). Monitoring events associated with one or more printing devices may include polling, by the computing device, the one or more printing devices for associated device states at one or more predefined polling intervals. For example, the computing device may request an associated device state, or a set of associated device states, from the printing device every ten minutes.

At block 904, the method 900 includes identifying, by the computing device, a correlation between a first event type of the monitored events and a second event type of the monitored events. The second event type may include a setting change, a property change, an alert, an error, a warning, or a device discovery. Such events may be referred to as activities about the one or more printing devices. Identifying the correlation may include calculating a correlation value between the first event type and the second event type, comparing the correlation value to a threshold correlation value, and determining that the correlation value is greater than the threshold correlation value (e.g., as illustrated in FIG. 6). In some embodiments, the threshold value may correspond to a percentage of occurrences of the first event type in which, within a predefined time period (e.g., five minutes), the second event type also occurs.

At block 906, the method 900 includes formulating, by the computing device, a rule based on the correlation. According to the rule, when the first event type occurs, the computing device causes the second event type to occur in response. In alternate embodiments, the rule may include, when the first event type occurs, at least one of the one or more printing devices causing the second event type to occur.

At block 908, the method 900 includes receiving, by the computing device, an indication that the rule should be implemented on the one or more printing devices. In some embodiments, the indication may be received through a user interface of the computing device. Further, the indication may include a selection from a user that indicates that the rule should be implemented.

At block 910, the method 900 includes implementing, by the computing device, the rule on the one or more printing devices. Implementing the rule may include storing the rule within a memory of the computing device. Additionally or alternatively, implementing the rule may include storing the rule within one or more memories of the one or more printing devices.

In alternate embodiments, the method 900 may also include modifying, by the computing device, the rule in response to an additional printing device being added to an organization associated with the one or more printing devices. Modifying the rule may include invoking, by the computing device, an assumption that the organization is representable as a closed system. Such a closed system may have a constant growth factor over an extended time, in some embodiments (e.g., grows by 5% in print volume each year). Modifying the rule may also include representing, by the computing device, a printing volume of the organization using a Boltzmann distribution (e.g., one of the Boltzmann distributions illustrated in FIG. 7A). Further, modifying the rule may include adjusting, by the computing device, locations of the one or more printing devices along the Boltzmann distribution to account for the added additional printing device. In addition, modifying the rule may include predicting, by the computing device, a print volume of the one or more printing devices based on the adjusted locations of the one or more printing devices along the Boltzmann distribution. Still further, modifying the rule may include adjusting, by the computing device, the rule based on the predicted print volume. In other embodiments, adjusting locations of the printing devices along the distribution may include swapping print volumes of two or more printing devices. For example, the printing volume of one printing device may increase by the same amount that the printing volume of another printing device decreases, thus effectively causing a swap in print volumes between those two printing devices along the distribution.

Additionally or alternatively, the method 900 may include receiving, by the computing device, an indication that the rule should no longer be implemented on the one or more printing devices. Further, the method 900 may include removing, by the computing device, implementation of the rule on the one or more printing devices (e.g., in response to receiving the indication).

In some embodiments, the method 900 may also include receiving, by the computing device, a request from a user to modify the formulated rule. Further, the method 900 may include modifying, by the computing device, the formulated rule. In addition, the method 900 may include implementing, by the computing device, the modified rule on the one or more printing devices.

In various embodiments, the method 900 may include receiving, by the computing device, an indication that the first event type has occurred. The method 900 may also include causing, by the computing device based on the rule, the second event type to occur on the one or more printing devices.

Further, in some embodiments, the method 900 may include prompting, by the computing device, a user to accept the formulated rule.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed:

1. A method, comprising:
monitoring, by a computing device, events associated with one or more printing devices;
identifying, by the computing device, a correlation between a first event type of the monitored events and a second event type of the monitored events;
formulating, by the computing device, a rule based on the correlation,
wherein, according to the rule, when the first event type occurs, the computing device causes the second event type to occur in response;
receiving, by the computing device, an indication that the rule should be implemented on the one or more printing devices;
implementing, by the computing device, the rule on the one or more printing devices;
causing, by the computing device in response to a determination that the first event type occurred and based on the implemented rule, the second event type to occur, wherein causing the second event type to occur comprises dispatching a service technician to at least one of the one or more printing devices; and
modifying, by the computing device, the rule in response to an additional printing device being added to an organization associated with the one or more printing devices, wherein modifying the rule comprises:
invoking, by the computing device, an assumption that the organization is representable as a closed system;
representing, by the computing device, a printing volume of the organization using a Boltzmann distribution;
adjusting, by the computing device, locations of the one or more printing devices along the Boltzmann distribution to account for the added additional printing device;
predicting, by the computing device, a print volume of the one or more printing devices based on the adjusted locations of the one or more printing devices along the Boltzmann distribution; and
adjusting, by the computing device, the rule based on the predicted print volume.

2. The method of claim 1, wherein the indication that the rule should be implemented on the one or more printing devices is based on a setting that indicates that every suggested rule should be accepted.

3. The method of claim 1, further comprising modifying, by the computing device, the rule in response to one of the one or more printing devices being decommissioned.

4. The method of claim 1, further comprising: generating, by the computing device, a histogram based on the print volume of the one or more printing devices over a specified time period;

fitting, by the computing device, the Boltzmann distribution to the histogram, wherein the Boltzmann distribution is associated with a corresponding state based on total printing volume within the organization; and swapping, by the computing device, print volumes of two of the printing devices based on the additional printing device.

5. The method of claim 1, wherein receiving, by the computing device, the indication that the rule should be implemented comprises receiving, through a user interface of the computing device, a selection from a user that indicates that the rule should be implemented.

6. The method of claim 1, wherein implementing, by the computing device, the rule comprises storing the rule within a memory of the computing device or storing the rule within one or more memories of the one or more printing devices.

7. The method of claim 1, wherein monitoring, by the computing device, the events associated with the one or more printing devices comprises polling, by the computing device, the one or more printing devices for associated device states at one or more predefined polling intervals.

8. The method of claim 1, wherein identifying, by the computing device, the correlation comprises:
calculating, by the computing device, a correlation value between the first event type and the second event type;
comparing, by the computing device, the correlation value to a threshold correlation value; and
determining, by the computing device, that the correlation value is greater than the threshold correlation value.

9. The method of claim 8, wherein the threshold correlation value corresponds to a percentage of occurrences of the first event type in which, within a predefined time period, the second event type also occurs.

10. The method of claim 1, further comprising: receiving, by the computing device, the indication that the rule should no longer be implemented on the one or more printing devices; and removing, by the computing device, implementation of the rule on the one or more printing devices.

11. The method of claim 1, wherein the events comprise activities performed by the one or more printing devices.

12. The method of claim 11, wherein the activities performed by the one or more printing devices comprise printing, scanning, copying, faxing, changing toner, cleaning ink jet heads, clearing paper jams, setting status alerts, powering on, or powering off.

13. The method of claim 1, wherein the events comprise requests transmitted from a user to the one or more printing devices.

14. The method of claim 13, wherein the transmitted requests comprise a print request, a scan request, a copy request, a fax request, a settings change, a power off request, a power on request, a reset request, a service request, or a firmware upgrade request.

15. The method of claim 1, further comprising:
receiving, by the computing device, a request from a user to modify the formulated rule;
modifying, by the computing device, the formulated rule; and
implementing, by the computing device, the modified rule on the one or more printing devices.

16. The method of claim 1, further comprising: receiving, by the computing device, an another indication that the first event type has occurred; and
causing, by the computing device based on the rule, the second event type to occur on the one or more printing devices.

17. The method of claim 1, further comprising prompting, by the computing device, a user to accept the formulated rule.

18. The method of claim 1,
wherein the second event type comprises an activity about the one or more printing devices,
wherein the activity about the one or more printing devices comprises:
a setting change;
a property change;
an alert;
an error;
a warning; or
a device discovery.

19. A system, comprising:
one or more printing devices; and
a printing device manager,
wherein the printing device manager comprises instructions, stored on a non-transitory, computer-readable medium, that are executable by a processor to:
monitor events associated with the one or more printing devices;
identify a correlation between a first event type and a second event type of the monitored events;
formulate a rule based on the correlation, wherein, according to the rule, when the first event type occurs, the processor causes the second event type to occur in response;
receive an indication that the rule should be implemented on the one or more printing devices;
implement the rule on the one or more printing devices;
cause, in response to a determination that the first event type occurred and based on the implemented rule, the second event type to occur,
wherein causing the second event type to occur comprises ordering a printing device to replace at least one of the one or more printing devices; and
modify the rule in response to an additional printing device being added to an organization associated with the one or more printing devices, wherein modifying the rule comprises:
invoking an assumption that the organization is representable as a closed system;
representing a printing volume of the organization using a Boltzmann distribution;
adjusting locations of the one or more printing devices along the Boltzmann distribution to account for the added additional printing device;
predicting a print volume of the one or more printing devices based on the adjusted locations of the one or more printing devices along the Boltzmann distribution; and
adjusting the rule based on the predicted print volume.

20. A printing device configured to:
provide, in response to a polling from a computing device, one or more signals corresponding to the printing device;
implement a rule formulated by the computing device,
wherein the rule is based on a correlation between a first event type and a second event type,
wherein the first event type corresponds to at least one of the one or more signals,
wherein the second event type corresponds to at least one of the one or more signals,
wherein the computing device received an indication that the rule should be implemented on the printing device, wherein the rule was modified by the computing device in response to an additional printing device being added to an organization associated with the printing device, and wherein modifying the rule comprises:
- invoking an assumption that the organization is representable as a closed system;
- representing a printing volume of the organization using a Boltzmann distribution;
- adjusting locations of printing devices of the organization along the Boltzmann distribution to account for the added additional printing device;
- predicting a print volume of the printing devices of the organization based on the adjusted locations of the one or more printing devices along the Boltzmann distribution; and
- adjusting the rule based on the predicted print volume; and perform the second event type in response to the first event type occurring, based on the implemented rule, wherein performing the second event type comprises:
- ordering a replacement toner cartridge, drum, gear, belt, tray, or electronic component for the printing device;
- clearing a paper jam;
- printing, scanning, copying, or faxing a document;
- executing an ink-jet head cleaning process;
- sending an email with a scanned image; or
- powering on or off the printing device.

* * * * *